(12) United States Patent
Hsu et al.

(10) Patent No.: US 10,460,353 B2
(45) Date of Patent: Oct. 29, 2019

(54) REAL-TIME CROSS-DEVICE USER CATEGORY SYNCHRONIZATION IN AN ADVERTISING CAMPAIGN

(71) Applicant: ORACLE INTERNATIONAL CORPORATION, Redwood Shores, CA (US)

(72) Inventors: James Kong Hsu, Redwood City, CA (US); Vernon Wah-Non Hui, Bellevue, WA (US); Jeffrey Charles Frantz, Alamo, CA (US); Eric Chi Kit Pang, Saratoga, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 661 days.

(21) Appl. No.: 14/734,473

(22) Filed: Jun. 9, 2015

(65) Prior Publication Data

US 2016/0125471 A1    May 5, 2016

Related U.S. Application Data

(60) Provisional application No. 62/072,935, filed on Oct. 30, 2014.

(51) Int. Cl.
*G06Q 30/02*        (2012.01)
(52) U.S. Cl.
CPC .................. *G06Q 30/0269* (2013.01)
(58) Field of Classification Search
None
See application file for complete search history.

(56) References Cited

U.S. PATENT DOCUMENTS 7,376,714 B1    5/2008  Gerken
2010/0146398 A1  6/2010  Evans et al.
(Continued)

OTHER PUBLICATIONS

Sinitsyn et al., A Synchronization Framework for Personal Mobile Servers, Proceedings of the Second IEEE Annual Conference on Pervasive Computing and Communications Workshop, Jan. 2004.*

(Continued)

*Primary Examiner* — Sam Refai
*Assistant Examiner* — Christopher C Busch
(74) *Attorney, Agent, or Firm* — Kilpatrick Townsend & Stockton, LLP

(57) ABSTRACT

The present disclosure provides systems, methods, and computer program products for real-time cross-device user category synchronization. Embodiments commence upon allocating or identifying user data records comprising two user profiles. The user profiles are populated with information by receiving electronic communications over a network, where the information comprises user category information and device attributes found in data records that originate from user devices. Steps are taken to associate a first device data record with a second device data record, wherein the association is based at least in part on a match between selected attributes among the user devices. User category information within the user profiles are synchronized to form updated user profiles. Some embodiments further execute steps for forming a cross-device map that identifies an association between an updated first user profile and a second user profile.

17 Claims, 18 Drawing Sheets

(56) References Cited

U.S. PATENT DOCUMENTS

| | | |
|---|---|---|
| 2012/0226700 A1 | 9/2012 | Chang et al. |
| 2013/0013500 A1 | 1/2013 | Purves et al. |
| 2013/0065584 A1 | 3/2013 | Lyon et al. |
| 2013/0110583 A1 | 5/2013 | Ormont et al. |
| 2013/0275228 A1 | 10/2013 | Milazzo |
| 2013/0281084 A1 | 10/2013 | Batada et al. |
| 2013/0339185 A1 | 12/2013 | Johnson |
| 2014/0136312 A1 | 5/2014 | Saksena et al. |
| 2014/0136346 A1 | 5/2014 | Teso |
| 2014/0330651 A1 | 11/2014 | Klemm et al. |
| 2016/0027055 A1* | 1/2016 | Dixon ................ G06Q 30/0261 705/14.58 |
| 2016/0055527 A1 | 2/2016 | Wiener et al. |
| 2016/0055540 A1 | 2/2016 | Chan et al. |
| 2016/0055542 A1 | 2/2016 | Hui et al. |
| 2016/0055546 A1 | 2/2016 | Chan et al. |
| 2016/0125467 A1 | 5/2016 | Scott et al. |
| 2016/0132938 A1 | 5/2016 | Wiener et al. |
| 2018/0067937 A1 | 3/2018 | Bauman |

OTHER PUBLICATIONS

International Search Report and Written Opinion dated Jan. 14, 2016 for related PCT Patent Application No. PCT/US2015/058165, 11 pages.
Google Maps, "The blue circle comes to your desktop", Jul. 9, 2009, 4 pages.
Google Maps Help, "See your location on Maps", 2015, 3 pages.
U.S. Appl. No. 14/831,565, First Action Interview Office Action Summary dated Jul. 12, 2018, 6 pages.
U.S. Appl. No. 14/831,565, First Action Interview Pilot Program Pre-Interview Communication dated May 31, 2018, 4 pages.
U.S. Appl. No. 14/831,565, Final Office Action dated Mar. 4, 2019, 15 pages.
U.S. Appl. No. 14/831,595, Final Office Action dated Mar. 6, 2019, 15 pages.
U.S. Appl. No. 14/831,595, First Action Interview Office Action Summary dated Jul. 12, 2018, 6 pages.
U.S. Appl. No. 14/831,595, First Action Interview Pilot Program Pre-Interview Communication dated Jun. 12, 2018, 4 pages.

* cited by examiner

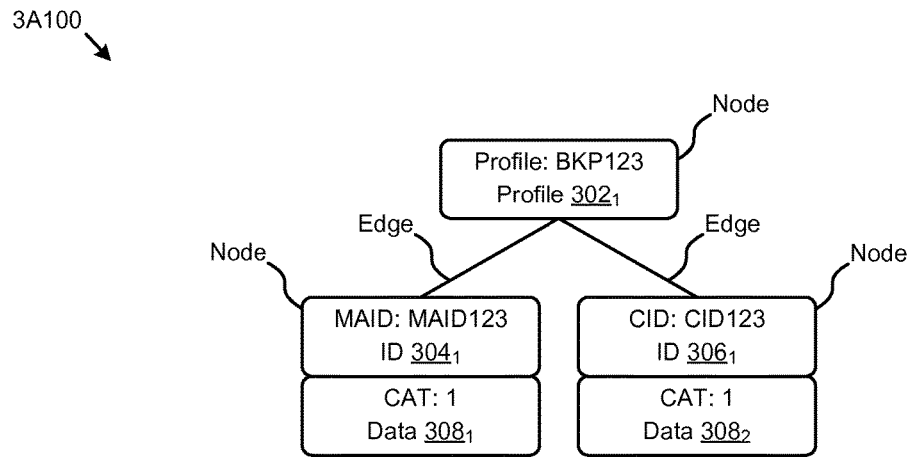
FIG. 3A1
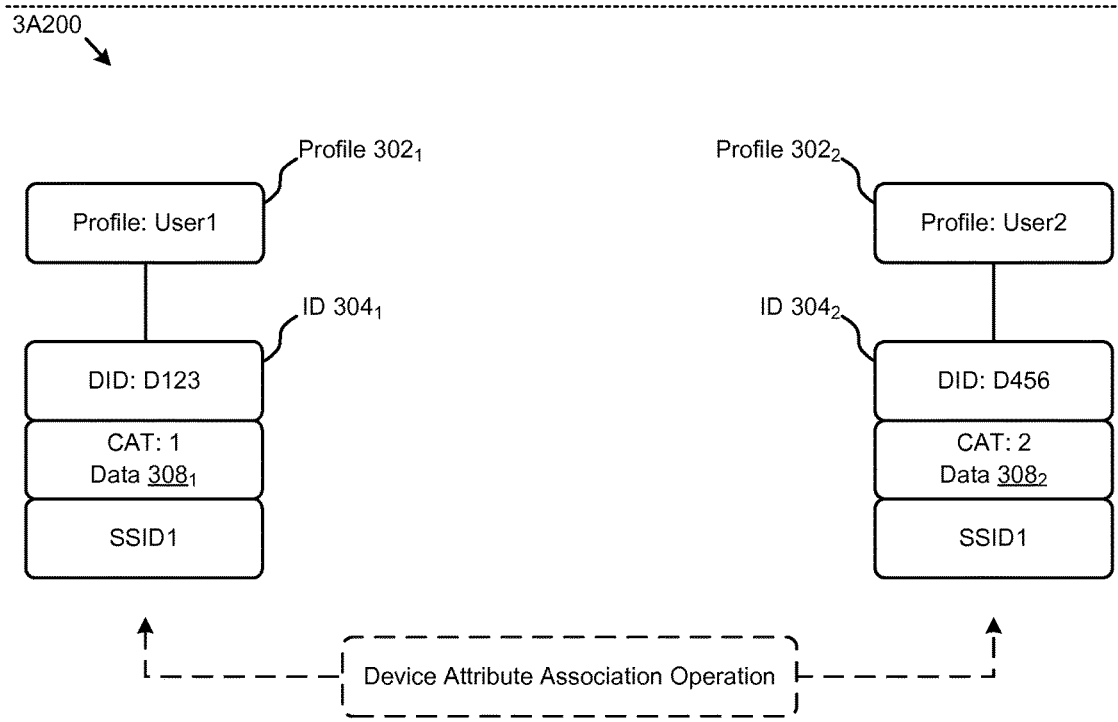
FIG. 3A2

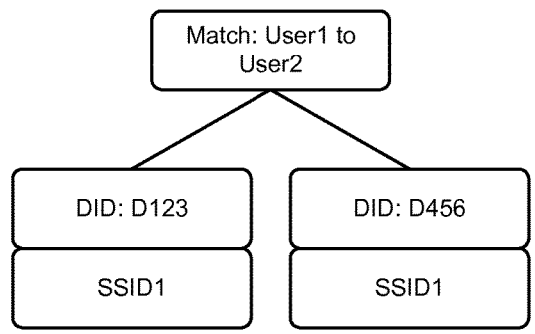
FIG. 3A3
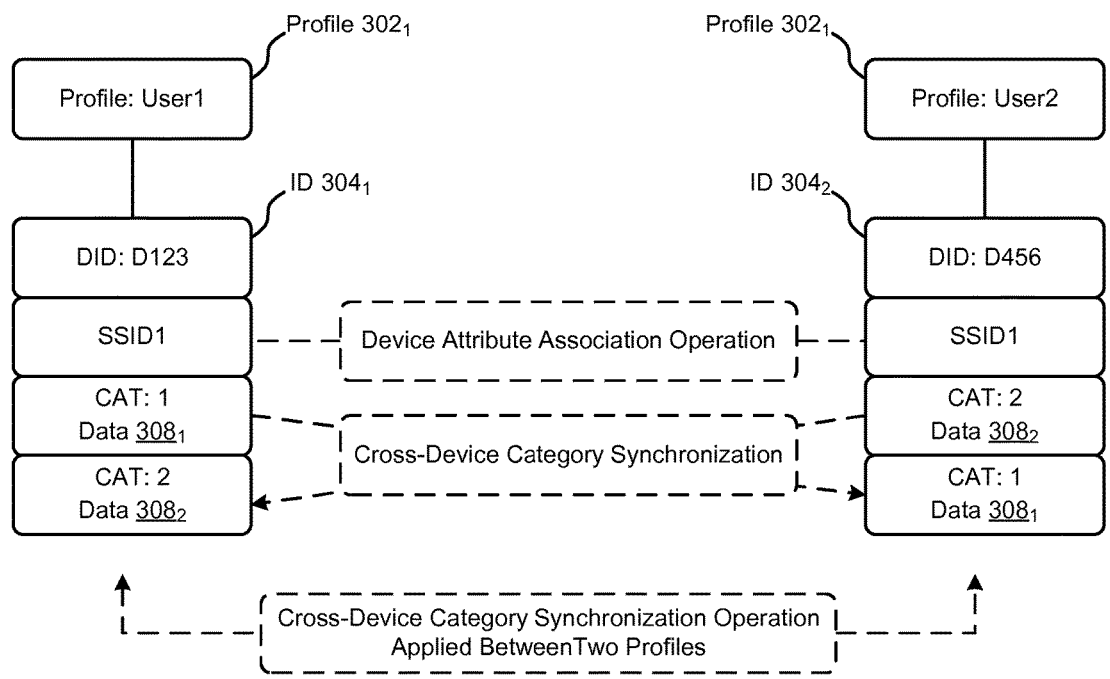
FIG. 3A4

REAL-TIME CROSS-DEVICE USER CATEGORY SYNCHRONIZATION IN AN ADVERTISING CAMPAIGN

RELATED APPLICATIONS

The present application claims the benefit of priority to U.S. Provisional Patent Application Ser. No. 62/072,935, entitled "REAL-TIME CROSS-DEVICE USER CATEGORY SYNCHRONIZATION", filed Oct. 30, 2014, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of managing cross-device Internet advertising campaigns, and more particularly to techniques for real-time cross-device user category synchronization in an advertising campaign.

BACKGROUND

With the proliferation of mobile devices (e.g., smartphones, tablets, etc.), the average person now owns multiple devices (e.g., averaging upwards of three in the USA, according to some surveys) and is using these devices at different times of the day for various online activities (e.g., work, email, web browsing, online shopping, watching TV, watching movies, etc.). These same device users can also have one or more devices at home (e.g., laptop computer, desktop computer, internet TV, etc.) that they further use for additional activities. To improve the effectiveness (e.g., conversion rate, optimized media spend, etc.) of online advertising campaigns, advertisers have a need to associate a given user with as many (or all) of the devices he or she may use in order to more confidently know or predict the interests of that user, so as to reach that user with targeted advertising (e.g., a "cross-device campaign"). Associating a set of devices with a given user is referred to herein as cross-device matching.

One legacy approach is to capture and associate browser cookie data with users who have logged into specific online accounts on multiple devices, yet advertisers want to retarget users who have expressed interest through user actions taken using multiple devices—even when none of the multiple devices support browser cookies.

To allow advertisers to take advantage of all available user profile information (e.g., categories) when performing cross-platform and cross-device user advertising targeting, there is a need for matching users across multiple devices and providing a cross-device map that serves to synchronize user categories (e.g., behaviors, buying interests, etc.) so as to improve the makeup of targeted audiences (e.g., to reach to same user on that user's many devices). What is needed is a technique or techniques to improve the application and efficacy of various technologies as compared with the application and efficacy of legacy approaches.

SUMMARY

The present disclosure provides improved systems, methods, and computer program products suited to address the aforementioned issues with legacy approaches. More specifically, the present disclosure provides a detailed description of techniques used in systems, methods, and in computer program products for real-time cross-device user category synchronization. The various embodiments address the problem of real-time delivery of user behaviors occurring over multiple devices to online advertisers executing cross-device campaigns. Certain embodiments are directed to technological solutions for performing cross-device user matching and user category synchronization in real-time, which embodiments advance the relevant technical fields, as well as advancing peripheral technical fields. The disclosed embodiments modify and improve over legacy approaches. In particular, practice of the disclosed techniques reduces use of computer memory, reduces demand for computer processing power, and reduces communication overhead needed for real-time cross-device user category synchronization. Some embodiments disclosed herein use techniques to improve the functioning of multiple systems within the disclosed environments, and some embodiments advance peripheral technical fields as well.

Some embodiments commence upon identifying user data records comprising two user profiles. The user profiles are populated with information by receiving electronic communications over a network, where the information comprises device attributes found in data records that originate from user devices. Steps are taken to associate a first device data record with a second device data record, wherein the association is based at least in part on a match between selected attributes between the user devices. Information within the user profiles are synchronized to form updated user profiles. Embodiments further execute steps for forming a cross-device map that identifies an association between an updated first user profile and a second user profile.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

FIG. 3A1, FIG. 3A2, FIG. 3A3, and FIG. 3A4 are visual representations data structures used by systems that implement real-time cross-device user category synchronization, according to an embodiment.

FIG. 4 exemplifies a logical view of cross-device matching used in systems for real-time cross-device user category synchronization, according to some embodiments.

DETAILED DESCRIPTION

Figure 1A:
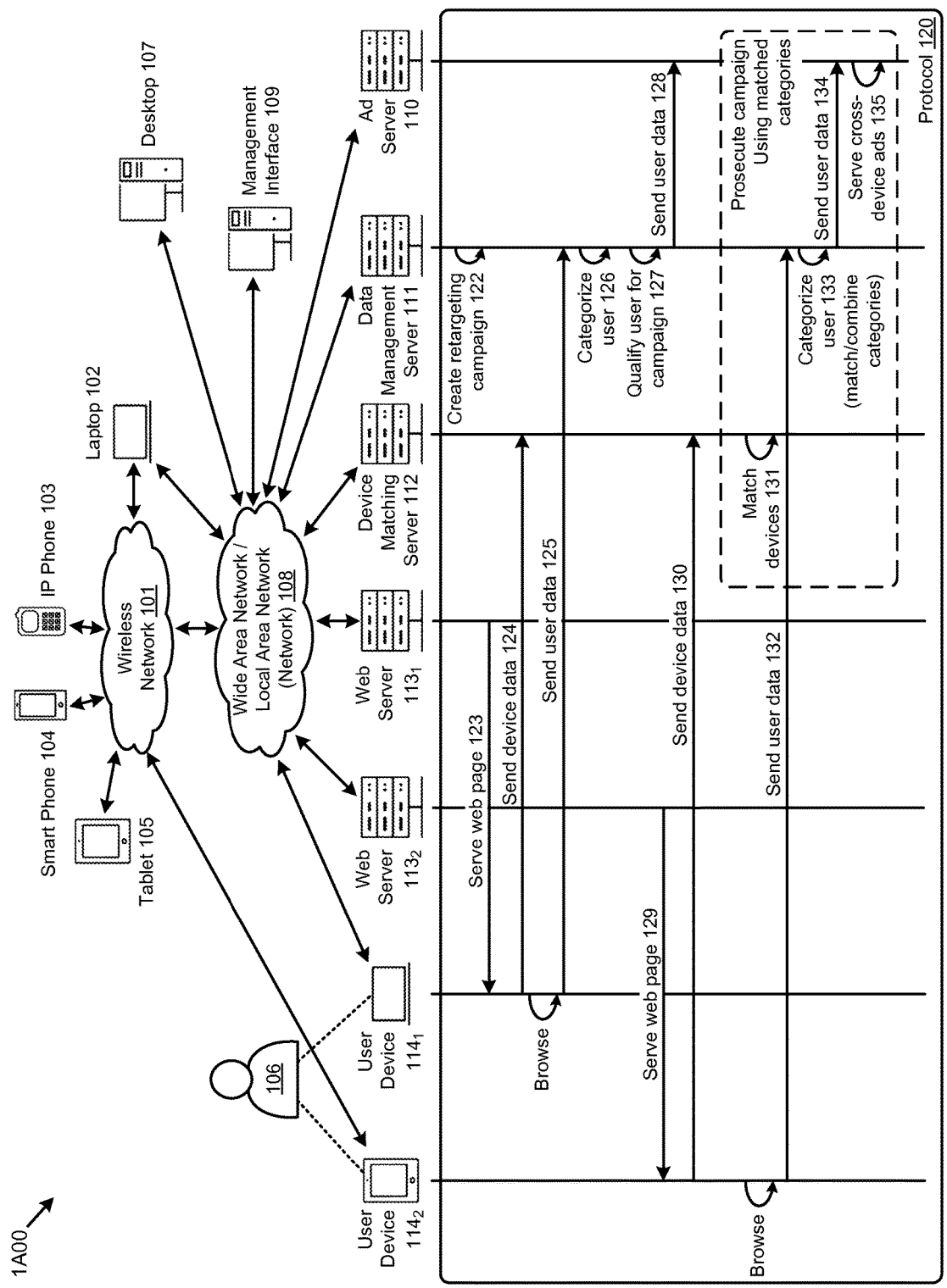
FIG. 1A shows an environment for implementing real-time cross-device user category synchronization.

Some embodiments of the present disclosure address the problem of real-time delivery of user behaviors occurring over multiple devices to online advertisers executing cross-device campaigns, and some embodiments are directed to approaches for matching users across multiple devices and providing real-time synchronized user categories (e.g., behaviors, buying interests, etc.) for those users identified as part of a target advertising audience. More particularly, disclosed herein and in the accompanying figures are exemplary environments, systems, methods, and computer program products for real-time cross-device user category synchronization.

Overview

With the proliferation of mobile devices (e.g., smartphones, tablets, etc.), the average person now owns multiple devices, and is using these devices at different times of the day for various online activities (e.g., work, email, web browsing, online shopping, watching TV, watching movies, etc.). These same device users can also have one or more devices at home (e.g., laptop computer, desktop computer, internet TV, etc.) that they further use for additional activities. To improve the effectiveness (e.g., conversion rate, optimized media spend, etc.) of online advertising campaigns, advertisers have a need to associate a given user with as many (or all) of the devices he or she may use in order more confidently know or predict the interests of that user so as to reach that user with targeted advertising (e.g., a "cross-device campaign"). Associating a set of devices with a given user can be referred to herein as cross-device matching. Discussed hereunder are techniques to address the problem of real-time delivery of user behaviors occurring over multiple devices to online advertisers executing a cross-device campaign. More specifically, approaches for real-time cross-device user category synchronization are disclosed.

In some embodiments, real-time cross-device user category synchronization can be implemented by receiving device data records associated with various user devices, receiving user data records (e.g., user profiles) associated with various users, and associating at least one user profile with at least one user device in a set of one or more identified user devices. In one or more embodiments, real-time cross-device user category synchronization can further comprise matching at least two of the identified user devices in at least one set of matched user devices included in a cross-device map (e.g., such as is depicted and discussed as pertains to the appended figures). In some embodiments, real-time cross-device user category synchronization can further include identifying at least one set of target users based on one or more user attributes (e.g., user categories) pertaining to a respective set of matched user devices. In other embodiments, such synchronization of categories can occur at the time of a certain user event relevant to the advertising campaign (e.g., in "real-time" whenever the user is "seen" online).

Instances of user categories can comprise user characteristics, observed user behaviors, observed user interests or stated user interests, user browsing history, user location or location history, survey answers, etc.

Various embodiments are described herein with reference to the figures. It should be noted that the figures are not necessarily drawn to scale and that the elements of similar structures or functions are sometimes represented by like reference numerals throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A shows an environment 1A00 for supporting methods, systems, and computer program products for real-time cross-device user category synchronization. As an option, one or more instances of environment 1A00 or any aspect thereof may be implemented in the context of the architecture and functionality of the embodiments described herein. Also, the environment 1A00 or any aspect thereof may be implemented in any desired environment.

As shown in FIG. 1A, environment 1A00 comprises one or more instances of data management server 111, one or more instances of device matching server 112, one or more instances of ad server 110, one or more instances of management interface device 109, one or more web servers (e.g., web server $113_1$ and web server $113_2$), and one or more user devices (e.g., user device $114_1$ and user device $114_2$). The plurality of user devices can represent one of a variety of other devices (e.g., a desktop computer 107, a laptop computer 102, an IP phone 103, a smart phone 104, a tablet 105, etc.). The aforementioned servers and devices can communicate through a wireless network 101 and a network 108 (e.g., a wide area network (WAN), a local area network (LAN), etc.).

A protocol 120 depicts operations and communications (e.g., messages) on and among the plurality of user devices, the plurality of web servers, device matching server 112, data management server 111, and ad server 110. In the example shown in protocol 120, a single user operates both of the shown user device $114_1$ and the shown user device $114_2$. Specifically, the protocol 120 can represent operations and communications that can occur when deploying a retargeting advertising campaign using the aforementioned legacy approaches. Specifically, the servers and devices in environment 1A00 are designed and configured to enable an advertiser to create a retargeting advertising campaign (e.g., using the management interface device 109) on the data management server 111 (see operation 122). For example, the campaign can be set up to send a retargeting ad to users who have recently visited a specific website (e.g., www-.firstsite.com). The web server $113_1$ can then serve a web page (e.g., see message 123) to the user device $114_1$ (e.g., in response to the user clicking a link, entering an URL, etc.). A portion of the content of the web page can include code (e.g., HTTP calls, beacons, tags, scripts, etc.) to capture and send device data about the user device $114_1$ to the device matching server 112 (see message 124). The user 106 may continue to browse on the user device $114_1$ (e.g., enter travel search criteria on www.firstsite.com, etc.) and other web page content or code can capture certain user attributes (e.g., site visited, travel destination interests, etc.) and send user data to the data management server 111 (see message 125). The data management server 111 will use the user data to categorize the user 106 (see operation 126) and, for example, qualify the user 106 (see operation 127) as meeting the criteria for the retargeting campaign (e.g., the user has recently visited www.firstsite.com). The data management server 111 will then send the user data to the ad server 110 as being included in the target audience (see message 128). At a later time, the web server $113_2$ can serve a web page (e.g., www.secondsite.com) to the user device $114_2$ (see message 129). A portion of the content of the web page can include code to capture and send device data about the user device $114_2$ to the device matching server 112 (see message 130). In the example of protocol 120, the device matching server 112 associates or matches the user device $114_1$ and the user device $114_2$ (see operation 131) by determining the two devices are operated by the same user (e.g., user 106) based on various data (e.g., device connection characteristics, IP port number, IP addresses or portions therefrom, WiFi networks used, WiFi SSIDs, websites visited, etc.) and methods (e.g., deterministic matching, probabilistic matching, etc.). The user 106 may continue to browse on the user device $114_2$ and other web page content or code can capture certain user attributes and send user data to the data management server 111 (see operation 132). The data management server 111 will then use the user data to categorize the user (see operation 133), and may send the user data to the ad server 110 (see message 134).

While the device matching server 112 knows that the user device $114_1$ and the user device $114_2$ are being operated by the same user (e.g., user 106), the device matching server 112 does not know this same user should be in the retargeting campaign audience. Further, the data management server 111 and ad server 110 know that the user of the user device $114_1$ is in the retargeting campaign audience, but the data management server 111 and the ad server 110 do not know the user of the user device $114_2$ is the same as the user of the user device $114_2$ (e.g., user 106), and should have been served the retargeting ad. In this case, the ad server 110 is still waiting to serve its retargeting ad and has missed an opportunity (see operation 135). Thus, there is a need for techniques to associate or match users across multiple devices (e.g., cross-device matching) and to provide real-time synchronized user categories (e.g., buying interests, etc.) for users that have been identified as a single user. Such techniques are described in FIG. 1B and herein.

Figure 1B:
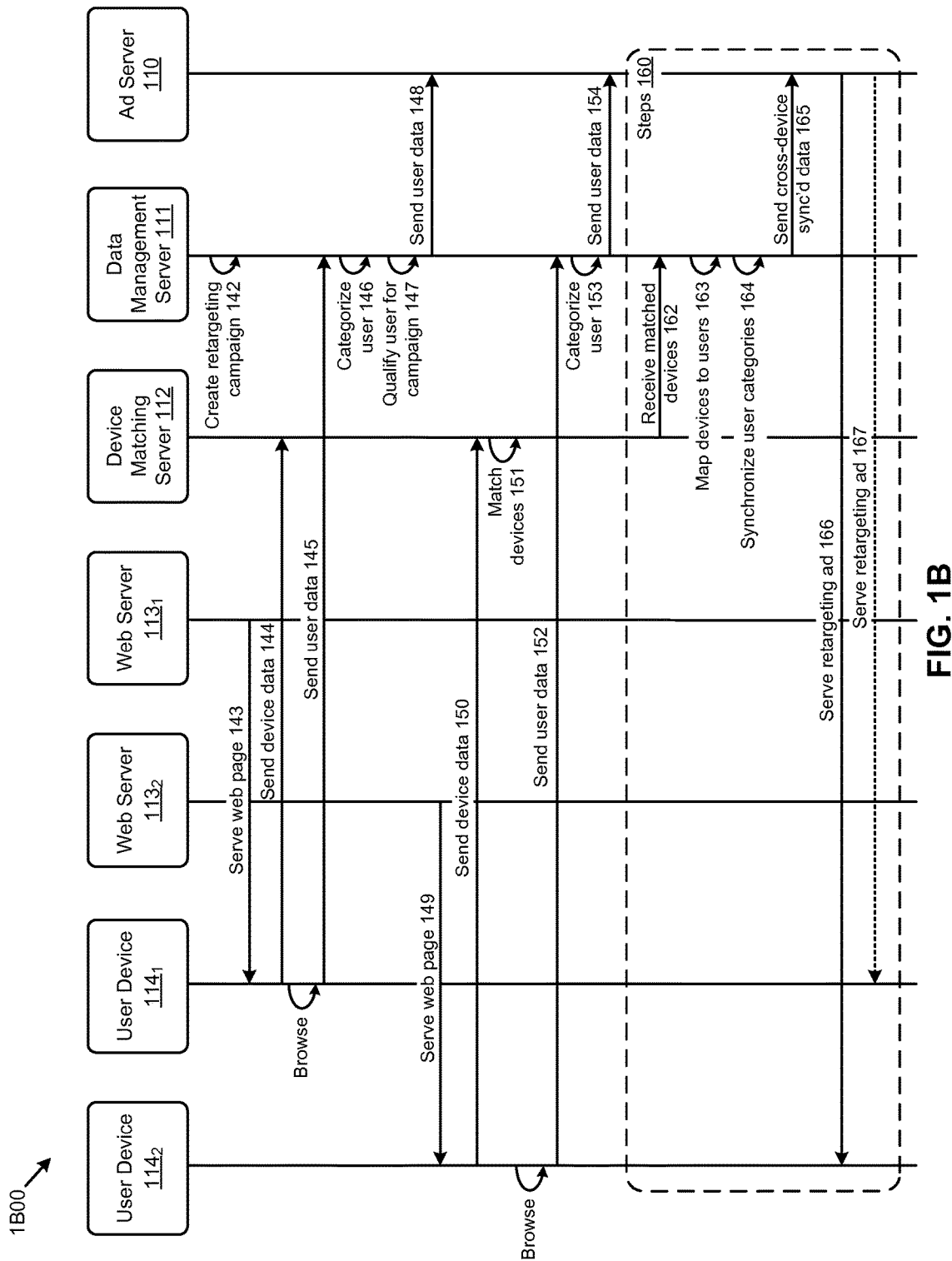
FIG. 1B depicts a protocol used by systems that implement real-time cross-device user category synchronization, according to some embodiments.

FIG. 1B depicts a campaign prosecution protocol 1B00 used by systems that implement real-time cross-device user category synchronization. As an option, one or more instances of campaign prosecution protocol 1B00 or any aspect thereof may be implemented in the context of the architecture and functionality of the embodiments described herein. Also, the campaign prosecution protocol 1B00 or any aspect thereof may be implemented in any desired environment.

As shown in FIG. 1B, campaign prosecution protocol 1B00 depicts operations and communications on and among the plurality of user devices (e.g., user device $114_1$ and user device $114_2$), the plurality of web servers (e.g., web server $113_1$ and web server $113_2$), device matching server 112, data management server 111, and ad server 110, from environment 1A00 of FIG. 1A. In the example shown in campaign prosecution protocol 1B00, the user 106 operates both user device $114_1$ and user device $114_2$. Specifically, the campaign prosecution protocol 1B00 can represent operations and communications that can occur when deploying a retargeting advertising campaign using the herein disclosed techniques and approaches for real-time cross-device user category synchronization. More specifically, the aforementioned servers and devices in campaign prosecution protocol 1B00 are designed and configured to enable an advertiser to create a retargeting advertising campaign (e.g., using the management interface device 109) on the data management server 111 (see operation 142). For example, the campaign can be set up to send a retargeting ad to users who have recently visited a specific website (e.g., www-.firstsite.com). The web server $113_1$ can then serve a web page (e.g., see message 143) to the user device $114_1$ (e.g., in response to the user clicking a link, entering an URL, etc.). A portion of the content of the web page can include code (e.g., HTTP calls, beacons, tags, scripts, etc.) to capture and send device data about the user device $114_1$ to the device matching server 112 (see message 144). The user 106 may continue to browse on the user device $114_1$ (e.g., enter travel search criteria on www.firstsite.com, etc.) and other web page content or code can capture certain user attributes (e.g., site visited, travel destination interests, etc.) and send user data to the data management server 111 (see message 145). The data management server 111 will use the user data to categorize the user 106 (see operation 146) and, for example, qualify the user 106 (see operation 147) as meeting the criteria for the retargeting campaign (e.g., the user has recently visited www.firstsite.com). The data management server 111 will then send the user data to the ad server 110 as being included in the target audience (see message 148). At a later time, the web server $113_2$ can serve a web page (e.g., www.secondsite.com) to the user device $114_2$ (see message 149). A portion of the content of the web page can include code to capture and send device data about the user device $114_2$ to the device matching server 112 (see message 150).

In the example of campaign prosecution protocol 1B00, the device matching server 112 associates or matches the user device $114_1$ and the user device $114_2$ (see operation 151) by determining the two devices are operated by the same user (e.g., user 106) based on various data (e.g., login information, connection IP addresses, WiFi networks used, websites visited, etc.) and methods (e.g., deterministic matching, probabilistic matching, etc.). The user 106 may continue to browse on the user device $114_2$ and other web page content or code can capture certain user attributes and send user data to the data management server 111 (see message 152). The data management server 111 will then use the user data to categorize the user (see operation 153), and may send the user data to the ad server 110 (see message 154).

In systems implementing real-time cross-device user category synchronization, a set of cross-device synchronization steps 160 will be executed, as shown in campaign prosecution protocol 1B00. Specifically, the data management server 111 will receive information describing the matched devices (e.g., devices IDs) from the device matching server 112 (see message 162) and implement techniques (e.g., ID swapping) to map devices to user profiles (e.g., see message 163) in a set of cross-device user mappings. The data management server 111 will then, in real-time (e.g., immediately when the user on the user device $114_2$ is seen online), synchronize the user categories associated with the cross-device user mappings (see operation 164) and send this cross-device synchronized data to the ad server 110 (see message 165). In this case, the ad server 110 will know that the user of the user device $114_2$ is the same as the user of the user device $114_1$, and will serve the retargeting ad to the user device $114_2$ (see message 166). The ad server 110 can also prepare to send the retargeting ad to the user device $114_1$ as soon as the user 106 begins browsing on the user device $114_1$ again. As shown in campaign prosecution protocol 1B00, the advertiser can track users across their different devices and capture additional opportunities to serve ads to a target audience (see message 167). Techniques for tracking users in web environments and mobile environments are described in FIG. 2.

Figure 2:
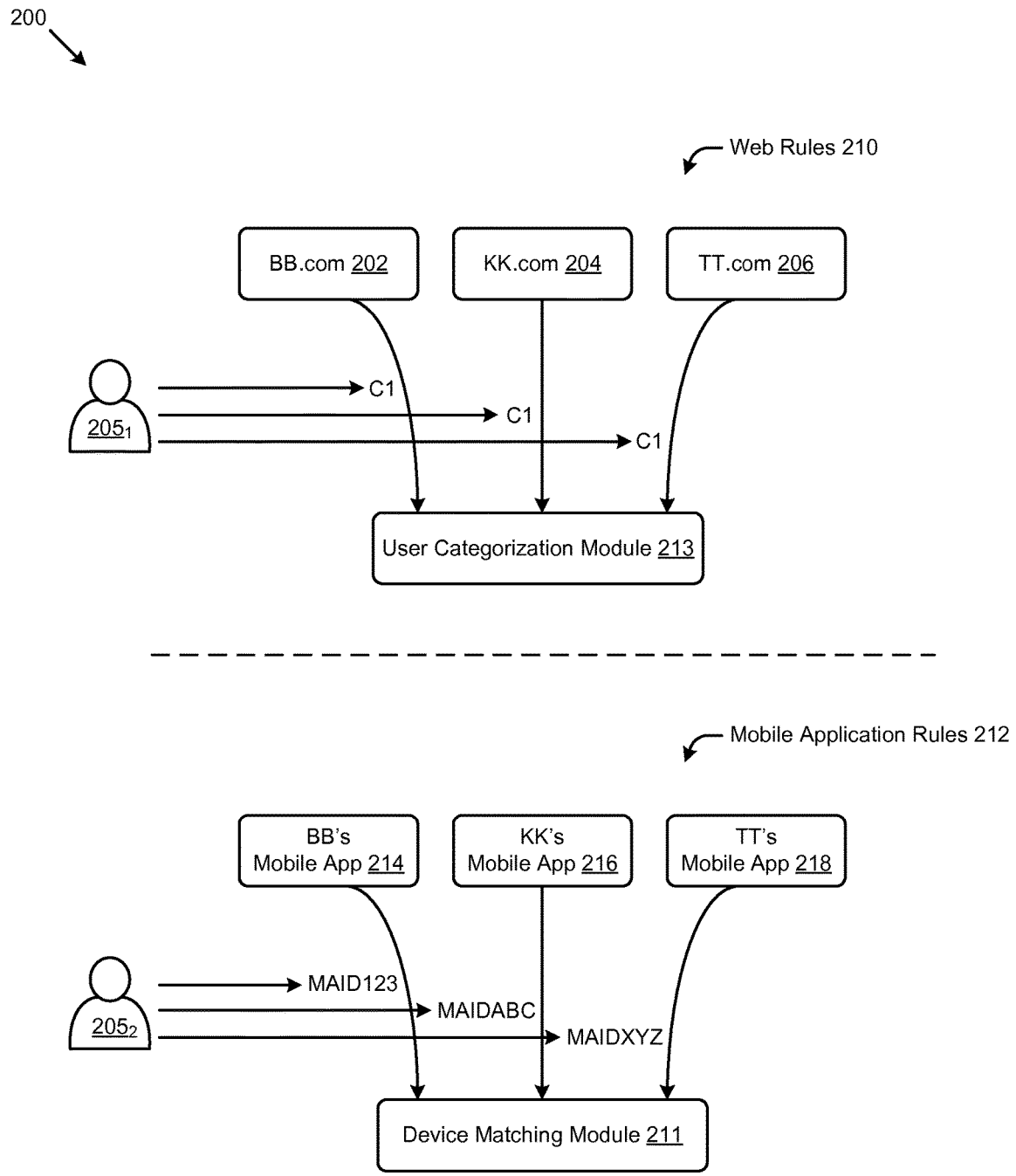
FIG. 2 depicts a comparison chart to compare user tracking in web environments and mobile device environments.

FIG. 2 depicts a comparison chart 200 to compare user tracking in web environments and mobile device environments. As an option, one or more instances of comparison chart 200 or any aspect thereof may be implemented in the context of the architecture and functionality of the embodiments described herein. Also, the comparison chart 200 or any aspect thereof may be implemented in any desired environment.

The comparison chart 200 contrasts user tracking in a desktop or web rules 210 environment (see top portion of FIG. 2) as compared with user tracking in accordance with mobile application rules 212 (see bottom portion of FIG. 2). For example, user tracking in a web rules 210 environment can represent the sending of user data in campaign prosecution protocol 1B00 (see message 145 and message 152). Also, for example, user tracking in accordance with mobile application rules 212 can represent the sending of device data in campaign prosecution protocol 1B00 (see message 144 and message 150). As shown in the top portion of FIG. 2, a desktop user $205_1$ visits a first site (e.g., BB.com 202) and a cookie C1 is saved to the device (e.g., desktop computer) used by the desktop user $205_1$. The cookie C1 can comprise a user data record describing various attributes of the desktop user $205_1$ (e.g., behaviors, interests, browsing history, location, devices, etc.). The desktop user $205_1$ can later visit a second site and a third site (e.g., KK.com 204, and TT.com 206, respectively) and, in each case, the cookie C1 is accessed and possibly updated. There is a one-to-one relationship between the desktop user $205_1$ and the cookie C1, and a user categorization module 213 (e.g., implemented on data management server 111) can recognize a single user from the cookie C1 and can process the cookie C1 information to associate one or more categories describing the desktop user $205_1$ with one or more user profiles.

In contrast, and as shown in the lower portion of FIG. 2, each mobile application (e.g., BB's mobile app 214, website KK's mobile app 216, website TT's mobile app 218, etc.) can have an associated mobile advertising ID or MAID (e.g., MAID123, MAIDABC, and MAIDXYZ, respectively). The MAIDs, sometimes more generally referred to as device IDs (e.g., Apple's IDFA or Android ID), can comprise a device data record describing various attributes of the device used by the mobile device user $205_2$ (e.g., locations, WiFi networks, websites visited, etc., etc.). Thus, when the mobile device user $205_2$ launches and uses BB's mobile app 214, an association between the mobile device user $205_2$ and MAID123 data might be formed. Also, an association between the mobile device user $205_2$ and MAIDABC data might be formed, as well as an association between mobile device user $205_2$ and MAIDXYZ data. A device matching module 211 can process the MAID data to match devices to users (e.g., cross-device matching) by creating associations between devices based on various data (e.g., login information, connection IP addresses, WiFi networks used, websites visited, etc.) and methods (e.g., deterministic matching, probabilistic matching, etc.) that indicate the same user (e.g., mobile device user $205_2$) operates the associated or matched devices.

In some cases, the device matching module 211 matches and synchronizes based on a membership relationship between the first set of user device attributes and a second set of user device attributes. For example, given a first IP address "71.192.10.1" and given a second IP address "71.192.10.2", a membership relationship can be formed based on the aspect that the second IP address "71.192.10.2" is a member of the subnet second IP address "71.192.10.X". IP masks can be applied to any IP address, and the masked IP address can be used to form membership relationships.

Further details describing the structure of user profiles are shown and described as follows.

FIG. 3A1 is a visual representation of a user profile 3A100 as used by systems that implement real-time cross-device user category synchronization. As an option, one or more instances of user profile 3A100 or any aspect thereof may be implemented in the context of the architecture and functionality of the embodiments described herein. Also, the user profile 3A100 or any aspect thereof may be implemented in any desired environment.

A user profile serves as a user data record that includes a user profile identifier that links multiple datasets (e.g., IDs, category data, etc.) together to carry the attributes of a given user. An edge or link represents an association that connects a user profile to an ID such as a mobile advertising ID (MAID) and/or a category group and/or a category identified by name or other identification code (CID). An ID can serve as a profile identifier, or a profile can subsume multiple IDs. Data corresponding to the profile identifier can be stored with an association to the profile identifier (e.g., an edge between nodes in an ID graph), and such data can be retrieved using the profile identifier as a key. Such data can conform to any syntax and/or semantics.

As shown, the user profile 3A100 comprises an ID graph having three nodes and two edges. The node for user profile BKP123 (see profile $302_1$) has two edges, which serve to link two IDs, namely MAID123 (see ID $304_1$) and CID123 (see ID $306_1$). Each of MAID123 and CID123 has associated category data, in this case data pertaining to CAT:1 (see data $308_1$ and data $308_2$).

In some cases, and as shown in the graph 3A200 of FIG. 3A2, a particular profile might have an association with only one ID. For example, the profile for User1 (e.g., profile $302_1$) has one edge, that edge serving to associate the User1 to a device D123 (e.g., ID $304_1$). Additional data such as device attributes (e.g., SSID1) can be stored with, or associated with, a device. Continuing, the profile for User2 (e.g., profile $302_2$) has one edge, that edge serving to associate the User2 to a device D456 (e.g., ID $304_2$). In this case as shown, the device attribute for user1 is the same as the device attribute for user2 (e.g., SSID1 is common between User1 and User2). Device attribute data can be used to form a match between devices and, in some cases, a matched device can be used to form a match between IDs. Any ID can carry associations to a category group and/or any number of categories identified by name or other identification code (e.g., a CID).

FIG. 3A3 depicts a match graph 3A300 where IDs referring to User1 and User2 have been matched using device attribute SSID1, even though the devices (e.g., D123 and D456) as identified in their respective IDs are different. The categories associated with respective matched IDs can be synchronized between to two IDs. Such a synchronization is shown inasmuch as the profile for User1 (e.g., see profile $302_1$) has an association with "CAT:2" and its data (e.g., data $308_2$), and the profile for User2 (e.g., see profile $302_2$) has an association with "CAT:1" and its data (e.g., data $308_1$).

The foregoing data structures and operations serve in systems for real-time cross-device user category synchronization. In the embodiment as heretofore described, the operations include identifying user data records (e.g., user profiles), where a user profile comprises a profile identifier, an associated user device identifier, and an associated category. At some moment in time the system receives electronic communications over a network, which communications comprise device data (e.g., a phone EIN, a WiFi SSID, or other device attributes) that originates from the user device. Such electronic communications can come from multiple devices.

Figure 3B:
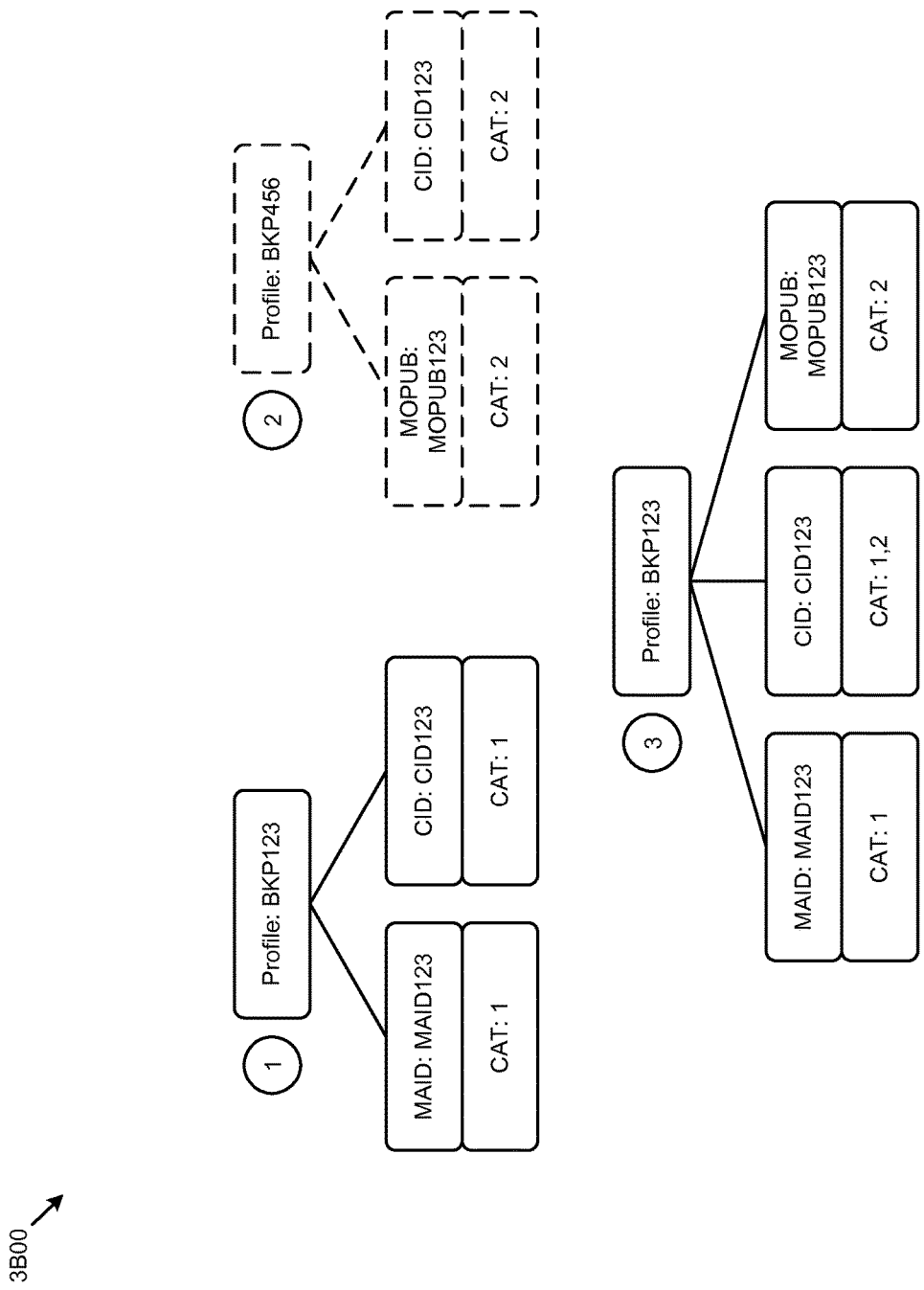
FIG. 3B is a visual representation of a user profile merge operation as used by systems that implement real-time cross-device user category synchronization, according to an embodiment.
Figure 4:
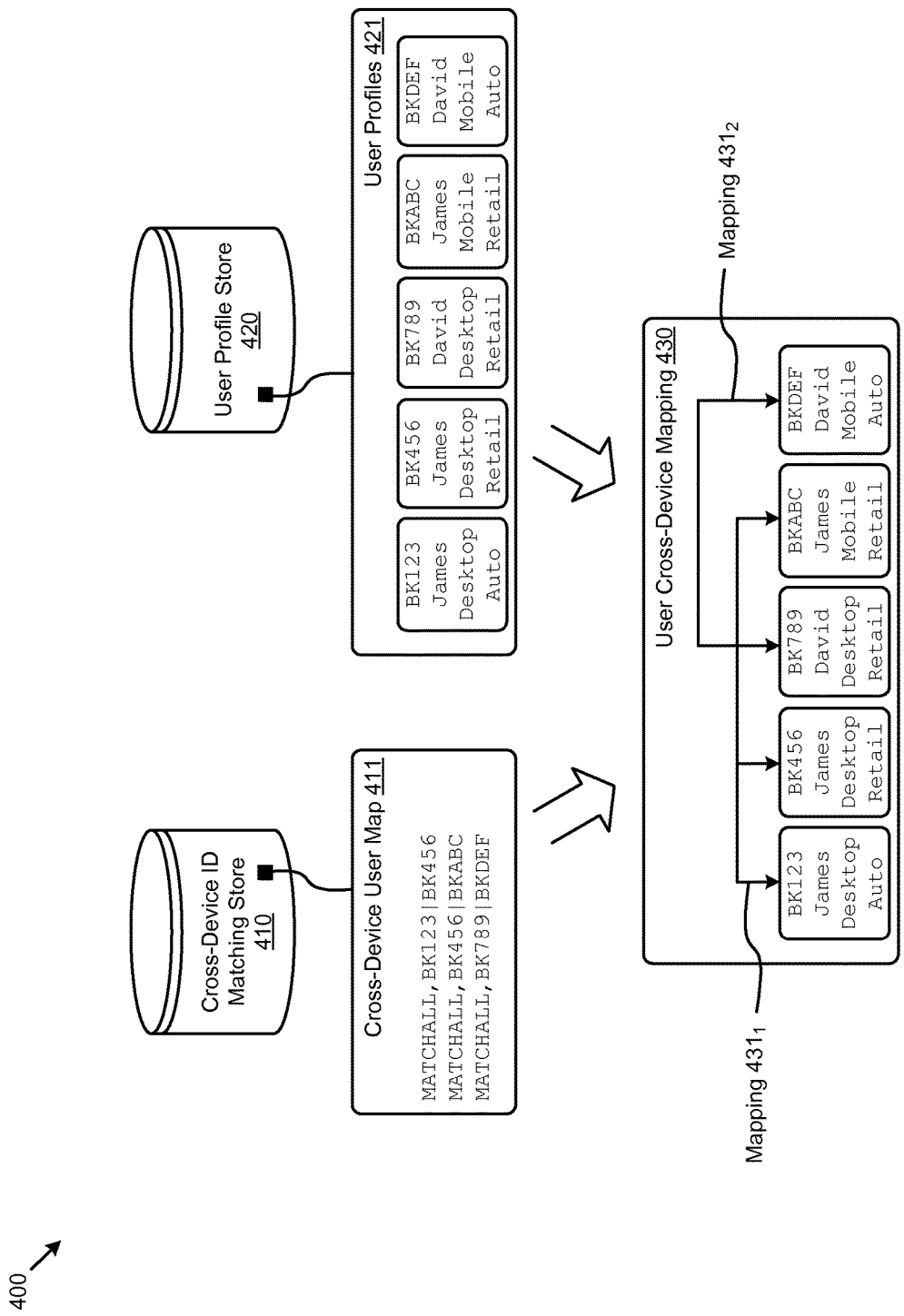

FIG. 3A4 depicts an annotated match graph 3A400 where categories between User1 and User2 have been synchronized. Various of the herein-disclosed techniques are employed by the system to associate a first user device data record with a second user device data record (e.g., by matching device attributes), which in turn forms an association between the users' respective to the matched devices, which in turn facilitates cross-synchronization of user categories. The user categories pertaining to the respective users can be cross-synchronized (e.g., by copying node data, or by forming graph edge associations between node data) to form an updated profile that has an association with the least one cross-synchronized user category.

Figure 3C:
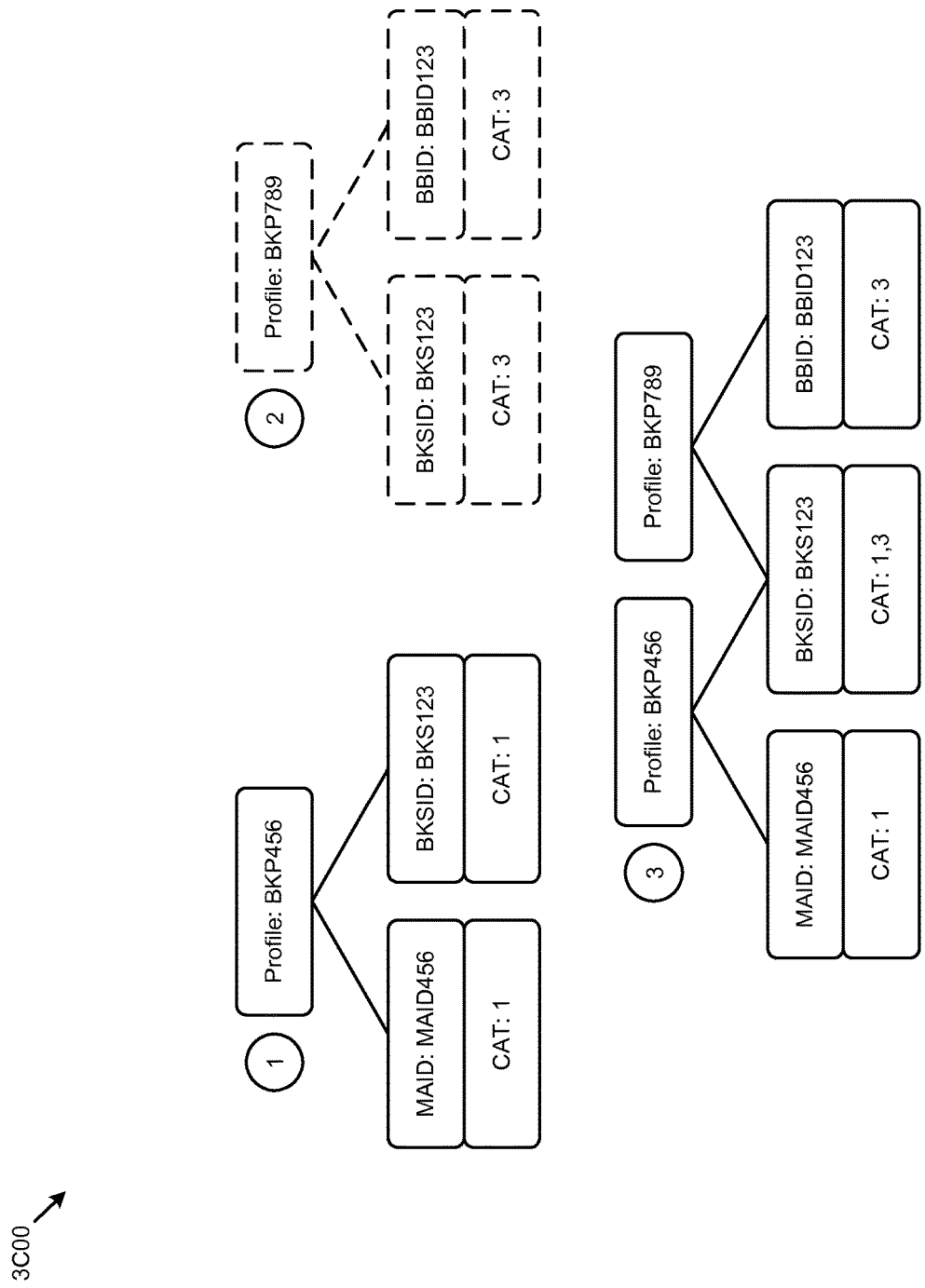
FIG. 3C is a visual representation of a user profile bridge operation as used by systems that implement real-time cross-device user category synchronization, according to an embodiment.

Further techniques for managing user profiles and associated data, such as can be used to implement cross-device matching and category synchronization, are discussed in FIG. 3B and FIG. 3C.

FIG. 3B is a visual representation of a user profile merge operation 3B00 as used by systems that implement real-time cross-device user category synchronization. As an option, one or more instances of user profile merge operation 3B00 or any aspect thereof may be implemented in the context of the architecture and functionality of the embodiments described herein. Also, the user profile merge operation 3B00 or any aspect thereof may be implemented in any desired environment.

As can be understood, a particular user (e.g., a real person) might use many devices. An event from a device might generate data (e.g., MAID data, CID data, etc.) that can be captured and processed to determine if the event belongs to a particular existing user (e.g., a user for which there is an existing user profile node), or if the event has been raised by what appears to be a new user for which user there is no user profile node. In the case that the event belongs to a particular existing user (e.g., a user for which there is an existing user profile node), the incoming data is added to the user's profile. As an example, MAID data from a certain mobile application running on a certain device can be received and added to an existing user profile as part of a cross-device matching operation. As another example, CID data can be received and added to an existing user profile as part of a category synchronization operation. In some cases, incoming data cannot be unambiguously assigned to an existing user profile. In such a case, a new user profile is created, and the incoming data is assigned to the new user profile. Later events may cause the new user profile to be merged with an existing user profile, such as when the user-to-data association can be known unambiguously (or at least to a statistical likelihood), and it can be determined that two user profiles refer to the same user. Such a merge operation (e.g., user profile merge operation 3B00) is described in FIG. 3B.

In FIG. 3B, the user profile merge operation 3B00 is depicted in three views:

- View 1 shows user profile BKP123 linked to MAID123 and associated data (e.g., CAT:1), and CID123 and associated data (e.g., CAT:1).
- View 2 shows user profile BKP456 linked to MOPUB123 and associated data (e.g., CAT:2), and CID123 and associated data (e.g., CAT:2).
- View 3 shows the result of the user profile merge operation 3B00 of user profile BKP456 into user profile BKP123. Specifically, the IDs linked to user profile BKP456 are merged under user profile BKP123, with any data associated with common IDs being combined (e.g., CID123 data is now CAT:1,2).

Alternatively, the merge operation could be performed by merging the IDs linked to user profile BKP123 into user profile BKP456. In either case (e.g., user profile BKP123 survives the merge, or user profile BKP456 survives the merge) all IDs under the surviving user profile have access to data brought in from other IDs during the merge operation.

In some cases, two different people may use the same mobile device. In many cases, such a situation can be detected, and when the database has evidence of two different people using the same mobile device, a bridge operation can link the two user profiles to the same mobile device ID. Such a situation is shown and described as pertains to FIG. 3C.

FIG. 3C is a visual representation of a user profile bridge operation 3C00 as used by systems that implement real-time cross-device user category synchronization. As an option, one or more instances of user profile bridge operation 3C00 or any aspect thereof may be implemented in the context of the architecture and functionality of the embodiments described herein. Also, the user profile bridge operation 3C00 or any aspect thereof may be implemented in any desired environment.

In FIG. 3C, the user profile bridge operation 3C00 is depicted in three views:

- View 1 shows user profile BKP456 linked to MAID456 and associated data (e.g., CAT:1), and BKS123 and associated data (e.g., CAT:1).
- View 2 shows user profile BKP789 linked to BKS123 and associated data (e.g., CAT:3), and BBID123 and associated data (e.g., CAT:3).
- View 3 shows the result of a merging operation of user profile BKP456 into user profile BKP123. Specifically, the IDs linked to user profile BKP456 are merged under user profile BKP123, with any data associated with common IDs being combined (e.g., CID123 data is now CAT:1,2).
- View 3 shows the result of the user profile bridge operation 3C00 between user profile BKP456 and user profile BKP789 based on the common statistical ID BKS123. Specifically, the user profile bridge operation 3C00 linked the two users associated with user profile BKP456 and user profile BKP789 (e.g., determined to be different people) to the same device described by MAID456.

In one or more embodiments, the data structures and data operations (e.g., merge, bridge, etc.) described in FIG. 3A, FIG. 3B, and FIG. 3C can be used in systems implementing the herein disclosed techniques for real-time cross-device user category synchronization. One embodiment of such techniques is described in FIG. 4.

FIG. 4 exemplifies a logical view 400 of cross-device matching used in systems for real-time cross-device user category synchronization. As an option, one or more instances of logical view 400 or any aspect thereof may be implemented in the context of the architecture and functionality of the embodiments described herein. Also, the logical view 400 or any aspect thereof may be implemented in any desired environment.

As shown in FIG. 4, logical view 400 comprises a cross-device ID matching store 410 comprising a cross-device user map 411, and comprises a user profile store 420 comprising a set of user profiles 421. The syntax and information shown in the cross-device user map 411 (e.g., stored in the cross-device ID matching store 410) indicate the user profile IDs that have been determined, in part, by various cross-device matching techniques to be associated with the same user. Specifically, the line "MATCHALL, BK123|BK456" in the cross-device user map 411 indicates that the user profile BK123 has been determined to be matched with the user profile BK456. Likewise, the cross-device user map 411 indicates that user profile BK456 is matched with BKABC, and user profile BK789 is matched with user profile BKDEF. By the associative property, user profile BK123 is also matched with user profile BKABC.

In the set of user profiles 421, the user profiles of five categorized users are shown, each with an associated user profile ID, real name, device type, and interest category. For example, user profile BK123 is associated with a user having a real name of "James", a device type of "Desktop", and an interest category of "Auto". When a user is seen online and the user profiles 421 and related categories are synchronized with the cross-device user map 411, the result is shown in a user cross-device mapping 430. Specifically, as shown, user profiles BK123, BK456, and BKABC are all mapped together (e.g., see mapping $431_1$), and user profiles BK789 and BKDEF are mapped together (e.g., see mapping $431_2$). Given the user cross-device mapping 430, advertisers can take advantage of all available user profile information (e.g., categories) when performing cross-platform and cross-device user advertising targeting. Specifically, the logical view 400 depicts techniques for matching users across multiple devices and providing real-time synchronized user categories (e.g., see mapping $431_1$ and mapping $431_2$) for those users identified as part of a target advertising audience. For example, an advertising campaign set to run against all matched users for all devices with an interest in "Auto" will deliver to all user profiles shown in the user cross-device mapping 430 (e.g., mapping $431_1$ and mapping $431_2$ comprise at least one user profile that includes an interest category of "Auto").

Figure 5A:
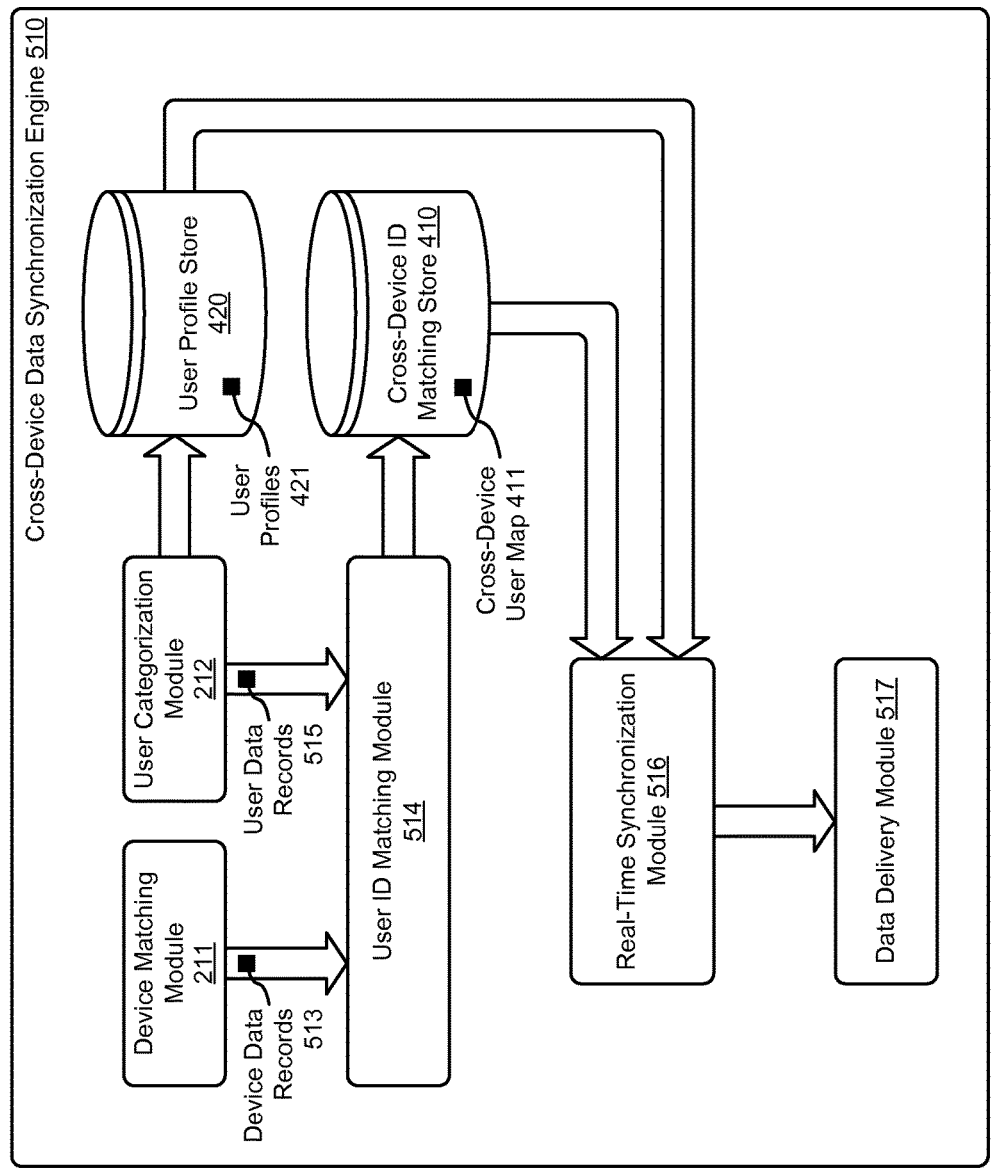
FIG. 5A is a block diagram of a cross-device data synchronization engine for implementing real-time cross-device user category synchronization, according to some embodiments.

One embodiment of a system for generating the user cross-device mapping 430 and other herein disclosed techniques is shown and described as pertains to FIG. 5A.

FIG. 5A is a block diagram 5A00 of a cross-device data synchronization engine for implementing real-time cross-device user category synchronization. As an option, one or more instances of block diagram 5A00 or any aspect thereof may be implemented in the context of the architecture and functionality of the embodiments described herein. Also, the block diagram 5A00 or any aspect thereof may be implemented in any desired environment.

As shown in FIG. 5A, block diagram 5A00 comprises a cross-device data synchronization engine 510 according to some embodiments. The cross-device data synchronization engine 510 comprises the device matching module 211, the user categorization module 213, the user profile store 420 (e.g., for storing instances of user profiles 421) and the cross-device ID matching store 410 (e.g., for storing a cross-device user map 411). The cross-device data synchronization engine 510 further comprises an ID matching module 514, a real-time synchronization module 516, and a data delivery module 517.

The ID matching module 514 is configured to receive device data records 513 to receive user data records 515 associated with various users, and to match user profiles selected from the various users with respective multiple user devices. The match user profiles can be stored in a cross-device ID matching store 410. A data delivery module 517 can access a stored cross-device user map 411 to prepare data to deliver to an advertiser for cross-device campaign prosecution so as to reach that user within a targeted advertising campaign that include targeted categories that derive from synchronization of categories based on cross-device user category synchronization.

In some embodiments, the modules shown in block diagram 5A00 can be implemented in a single computing system (e.g., data management server 111), and in other embodiments, the modules shown in block diagram 5A00 can be implemented in multiple computing systems (e.g., data management server 111 and device matching server 112). In some embodiments, other computing systems, modules, devices, and the like can be required to support the cross-device data synchronization engine 510. One embodiment of the capabilities and operations of the modules of cross-device data synchronization engine 510 are described in FIG. 5B and the associated disclosure.

Figure 5B:
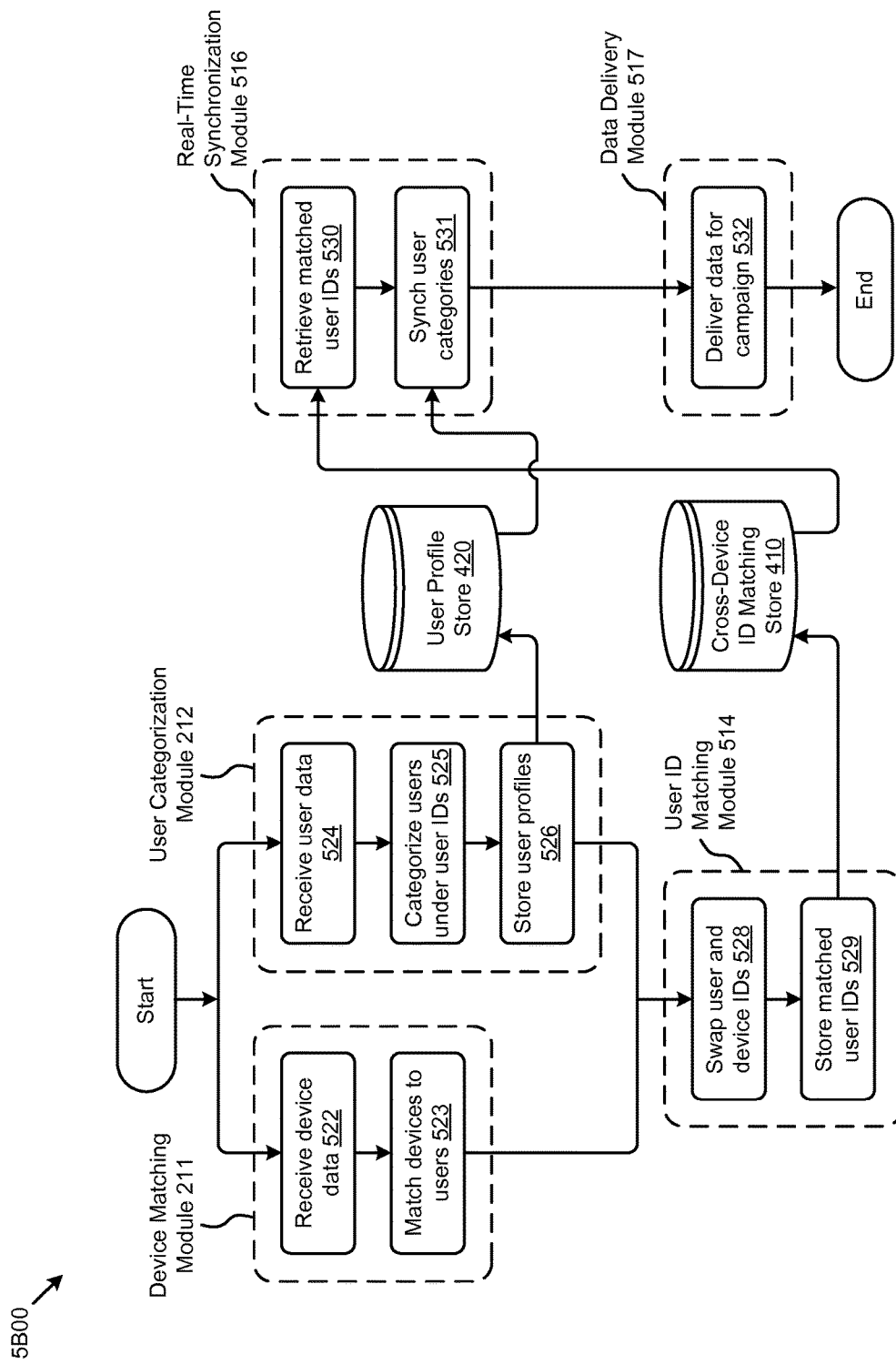
FIG. 5B presents a flow diagram used by systems that implement real-time cross-device user category synchronization, according to some embodiments.

FIG. 5B presents a flow diagram 5B00 used by systems that implement real-time cross-device user category synchronization. As an option, one or more instances of flow diagram 5B00 or any aspect thereof may be implemented in the context of the architecture and functionality of the embodiments described herein. Also, the flow diagram 5B00 or any aspect thereof may be implemented in any desired environment.

As shown in FIG. 5B, and with reference to cross-device data synchronization engine 510 in block diagram 5A00, the first steps in flow diagram 5B00 are for the device matching module 211 to receive device data (see step 522) and the user categorization module 213 to receive user data (see step 524). For example, device data can be received from mobile application information associated with various devices, and user data can be received from cookie information associated with various desktop users. The device matching module 211 will then process the device data (e.g., online device data and mobile device data) to match devices to users (e.g., cross-device matching) by creating associations (e.g., using merge operations) between devices (e.g., device IDs) based on various data (e.g., login information, connection IP addresses, WiFi networks used, websites visited, etc.) and methods (e.g., deterministic matching, probabilistic matching, etc.) that indicate the same user operates the associated or matched devices (see step 523). The user categorization module 213 will also process the user data (e.g., buying preferences, interest categories, etc.) to categorize users under user profiles (see step 525), and store the user profiles in the user profile store 420 (see step 526), possibly as a merged user profile node or nodes in a graph referenced by a user profile ID. In some embodiments, the receiving and processing of the device data and the receiving and processing of the user data can occur asynchronously and/or on different servers, and in some cases bridged user profiles are processed by the user categorization module 213.

The ID matching module 514 can then further "swap" user profile IDs and device IDs, producing an association between user profiles based on matched devices (see step 528). More specifically, such an association between user profiles based on matched devices can result in a cross-device user map (e.g., cross-device user map 411) that indicates the user profile IDs that have been determined, in part, by various cross-device matching techniques, to be associated with the same user. The ID matching module 514 will then store the cross-device user map in the cross-device ID matching store 410 (see step 529). When a user is determined to be (e.g., "seen") online, the real-time synchronization module 516 will retrieve all the matched user profile IDs associated with the online user from the cross-device ID matching store 410 (see step 530) and synchronize all of the user categories (e.g., from user profile store 420) associated with the matched user profile IDs (see step 531). For example, the user can be "seen" online through actual current online activity (e.g., user DOM events, HTTP requests, etc.), simulated online activity (e.g., based on previous 30 days of activity), or any other triggers relevant to the advertising campaign. Any new user data resulting in a category mapping are also synchronized across all matched user profile IDs. The result is a real-time, synchronized, cross-device list of matched user profile IDs with the same categories. In some embodiments, these categories are not saved back to the user profile database, but instead are synchronized in real-time for the system to deliver data for campaign purposes by data delivery module 517 (see step 532).

Figure 6:
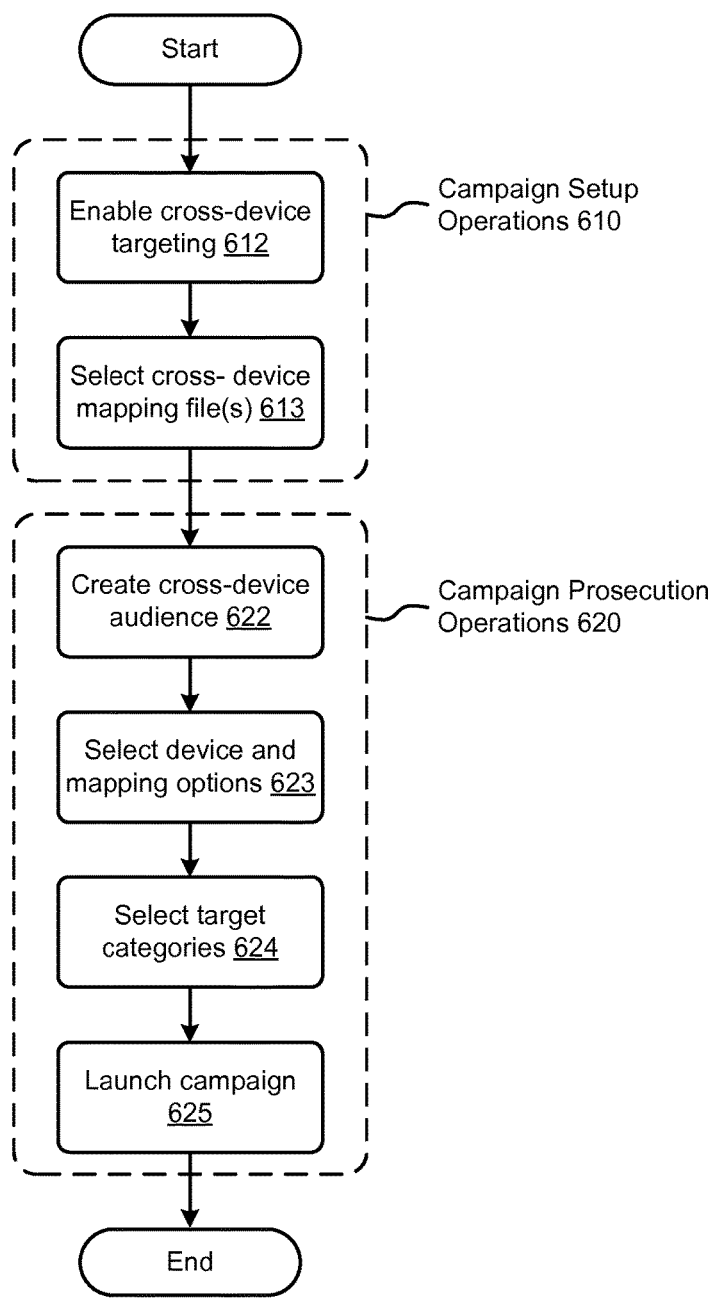
FIG. 6 depicts a flow diagram of a flow for managing a cross-device advertising campaign in systems that implement real-time cross-device user category synchronization, according to some embodiments.

FIG. 6 depicts a flow diagram of a flow 600 for managing a cross-device advertising campaign in systems that implement real-time cross-device user category synchronization. As an option, one or more instances of flow 600 or any aspect thereof may be implemented in the context of the architecture and functionality of the embodiments described herein. Also, the flow 600 or any aspect thereof may be implemented in any desired environment.

Flow 600 illustrates a set of campaign setup operations 610 and a set of campaign prosecution operations 620 that can be executed (e.g., using a man-machine interface) to manage (e.g., setup and launch) a cross-device advertising campaign in systems that implement real-time cross-device user category synchronization, according to one or more embodiments. Specifically, a data provider can enable cross-device targeting for one or more advertisers (see step 612), and select one or more cross-device mapping files to be used in the cross-device targeting (see step 613). Once the data provider has enabled cross-device targeting, a service bureau can create a cross-device audience for one or more campaigns (see step 622). The advertiser can further specify the cross-device audience by selecting various device type options (e.g., desktop only, mobile only, etc.) and associated mapping options (see step 623). The advertiser can specify the categories (e.g., "Auto") to be included in identifying the target audience (see step 624). Selection of other attributes and constraints related to the audience and campaign are possible. When the cross-device audience has been specified, the advertiser can launch the cross-device campaign (see step 625).

Figure 7A:
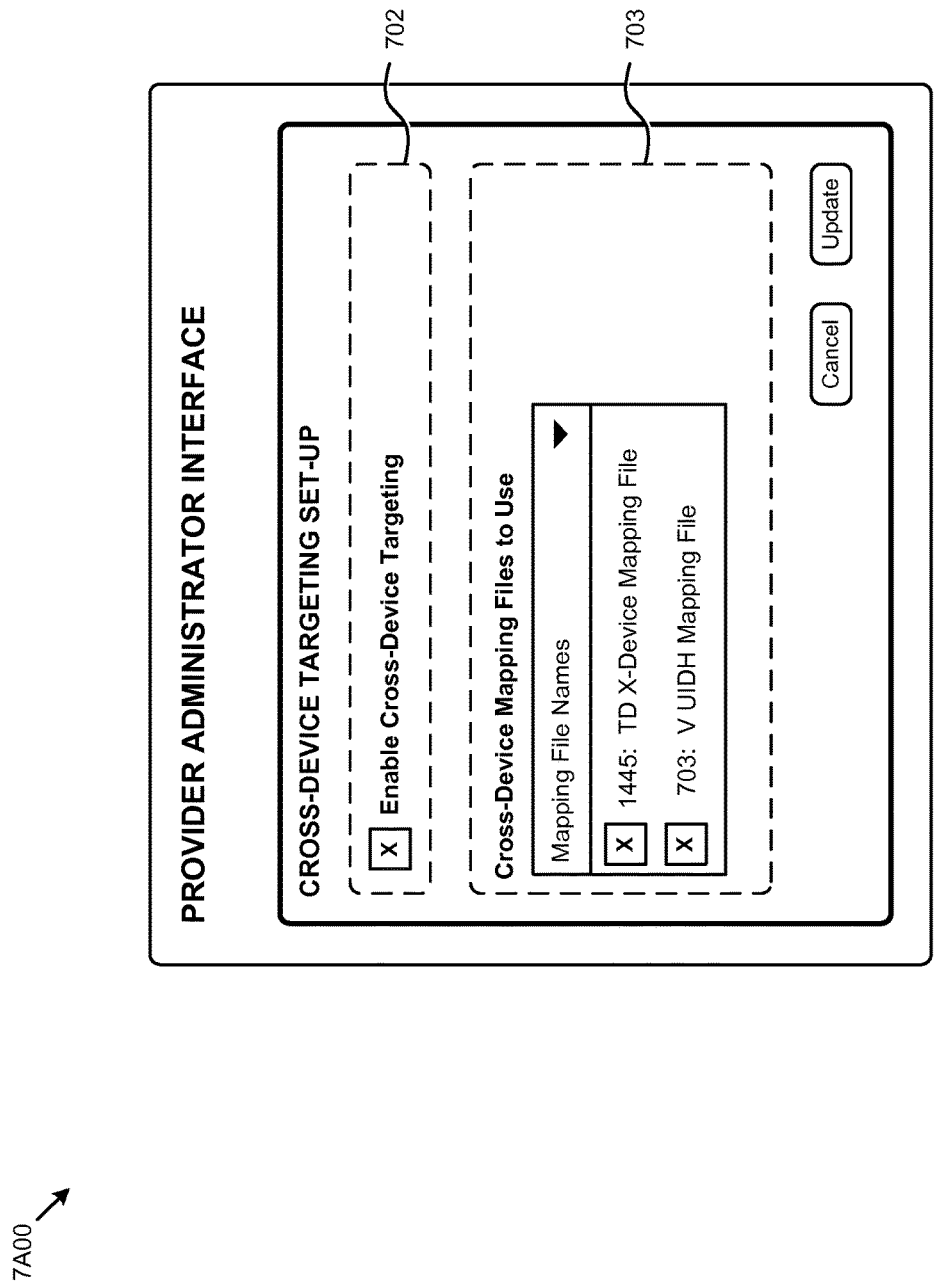
FIG. 7A presents a man-machine interface layout used to facilitate management of cross-device targeting parameters implemented in systems for real-time cross-device user category synchronization, according to some embodiments.
Figure 7B:
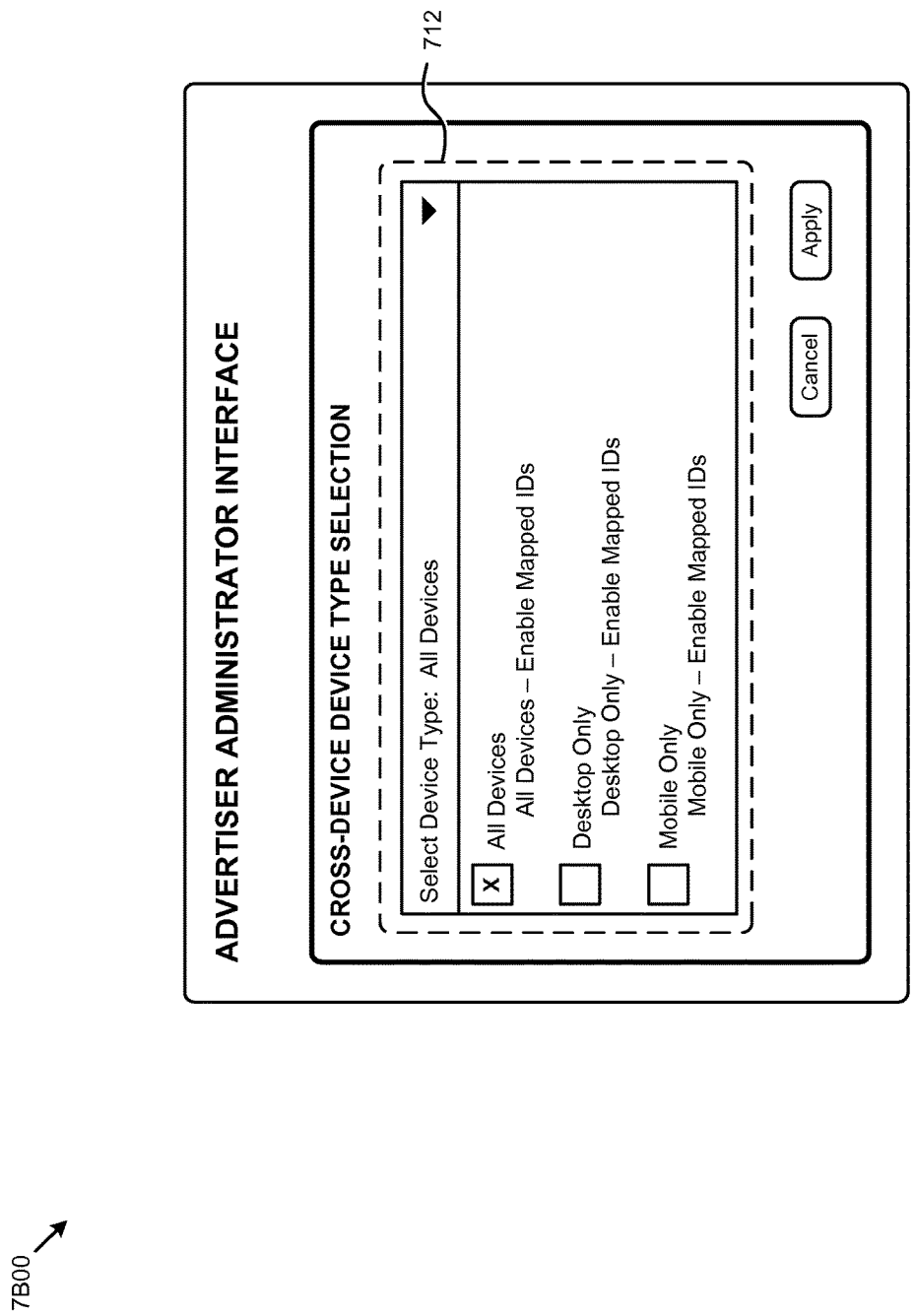
FIG. 7B presents a man-machine interface layout used to manage cross-device audiences as implemented in systems for real-time cross-device user category synchronization, according to some embodiments.

FIG. 7A and FIG. 7B present embodiments of man-machine interface layouts that can facilitate the operations depicted in flow 600 and other operations in systems implementing real-time cross-device user category synchronization.

FIG. 7A presents a man-machine interface layout 7A00 used to facilitate management of cross-device targeting parameters implemented in systems for real-time cross-device user category synchronization. As an option, one or more instances of man-machine interface layout 7A00 or any aspect thereof may be implemented in the context of the architecture and functionality of the embodiments described herein. Also, the man-machine interface layout 7A00 or any aspect thereof may be implemented in any desired environment.

As shown in FIG. 7A, the man-machine interface layout 7A00 is designed to allow administrators representing data management providers and other parties to manage cross-device matching and category synchronization capabilities related to various advertising campaigns. The man-machine interface layout 7A00 is presented to the provider by an application on a computing device (e.g., data management server 111 or management interface device 109 from environment 1A00). In one embodiment, the man-machine interface layout 7A00 will allow the provider to enable or disable cross-device targeting for a given advertiser. Specifically, in one embodiment, the man-machine interface layout 7A00 shows a checkbox item 702 the provider can check to enable or disable cross-device targeting. When cross-device targeting is enabled, the man-machine interface layout 7A00 will further allow the provider to select one or more mapping files (e.g., cross-device user map 411 in logical view 400) to be used in audience generation for the advertiser. As shown in the man-machine interface layout 7A00, a drop-down selection item 703 allows the provider to select two mapping file sources (e.g., "TD X-Device Mapping File" and "V UIDH Mapping File"). In some embodiments, a mapping file source comprises any form of the herein-discussed cross-device map, which cross-device map can be organized into any form of data structure and/or an electronic file. Such an electronic file can be communicated over a network (e.g., from a first server to a second server and/or vice-versa).

FIG. 7B presents a man-machine interface layout 7B00 used to manage cross-device audiences as implemented in systems for real-time cross-device user category synchronization. As an option, one or more instances of man-machine interface layout 7B00 or any aspect thereof may be implemented in the context of the architecture and functionality of the embodiments described herein. Also, the man-machine interface layout 7B00 or any aspect thereof may be implemented in any desired environment.

As shown in FIG. 7B, man-machine interface layout 7B00 is designed to allow administrators representing advertisers and other parties to manage cross-device advertising campaign capabilities. The man-machine interface layout 7B00 is presented to the advertiser by an application (e.g., browser) on a computing device (e.g., management interface device 109 from environment 1A00). In one embodiment, the man-machine interface layout 7B00 will not be available to the advertiser if cross-device targeting is not enabled for the advertiser by the data management provider (e.g., see checkbox item 702 in man-machine interface layout 7A00). If cross-device targeting is enabled, the man-machine interface layout 7B00 allows the advertiser to create a new audience and select from a set of options 712 that serve to define the target audience. In the example shown in the man-machine interface layout 7B00, the options 712 include device type options (e.g., "All Devices", "Desktop Only", "Mobile Only"), and for each device type option, an "Enable Mapped IDs" suboption is provided. The "Enable Mapped IDs" option will include in the target audience any users who are mapped to a user that is directly associated (e.g., tagged) with a given category. After choosing from options 712, the advertiser might select one or more categories (e.g., "Auto") to further define the campaign. Specific options from options 712 and examples referencing the information in logical view 400 are described below.

Selecting the "All Devices" option will return all users from all devices who have been directly tagged with the categories targeted. If "Enable Mapped IDs" is selected, any users (e.g., from all devices) who are indirectly tagged will also be returned. For example, if option "All Devices" and category "Auto" were specified, yet "Enable Mapped IDs" is not selected, the user cross-device mapping 430 would yield a combined reach of two, since user profile BK123 (e.g., "James") and user profile BKDEF (e.g., "David") are tagged with "Auto" on "Desktop" and "Mobile", respectively. If "Enable Mapped IDs" is also selected, any user profile that is either explicitly tagged as "Auto" or implicitly tagged as "Auto" qualifies because it is mapped to another user profile that is explicitly tagged as "Auto". In this case, "All Devices" and "Enable Mapped IDs" are selected, so user cross-device mapping 430 would yield a combined reach of five since all remaining user profiles are mapped to the two explicitly tagged user profiles (e.g., user profile BK123 and user profile BKDEF).

Selecting the "Desktop Only" option will return all users from desktop devices who have been directly tagged with the categories selected. If "Enable Mapped IDs" is selected, any desktop users who are indirectly tagged users will also be returned. For example, if option "Desktop Only" and category "Auto" were specified, yet "Enable Mapped IDs" is not selected, the user cross-device mapping 430 would yield a combined reach of one, since only user profile BK123 (e.g., "James") is tagged with "Auto" on "Desktop". If "Enable Mapped IDs" is also selected, any desktop user profile that is either explicitly tagged as "Auto" or implicitly tagged as "Auto" qualifies, because it is mapped to another user profile that is explicitly tagged as "Auto". Thus, in the case when "Desktop Only" and "Enable Mapped IDs" are selected, the user cross-device mapping 430 would yield a combined reach of four, since two additional desktop user profiles BK456 (e.g., "James") and BK789 (e.g., "David") are mapped to the two explicitly tagged user profiles (e.g., user profile BK123 and user profile BKDEF).

Selecting the "Mobile Only" option will return all users from mobile devices who have been directly tagged with the categories selected. If "Enable Mapped IDs" is selected, any mobile users who are indirectly tagged users will also be returned. For example, if option "Mobile Only" and category "Auto" were specified, yet "Enable Mapped IDs" is not selected, the user cross-device mapping 430 would yield a combined reach of one, since only user profile BKDEF (e.g., "David") is tagged with "Auto" on "Mobile". If "Enable Mapped IDs" is also selected, any mobile user profile that is either explicitly tagged as "Auto" or implicitly tagged as "Auto" qualifies. Thus, in this case (e.g., "Mobile Only" and "Enable Mapped IDs" are selected), the user cross-device mapping 430 would yield a combined reach of two, since one additional mobile user profile BKABC (e.g., "James") is mapped to the two explicitly tagged user profiles (e.g., user profile BK123 and user profile BKDEF).

Additional Embodiments of the Disclosure

Additional Practical Application Examples

Figure 8A:
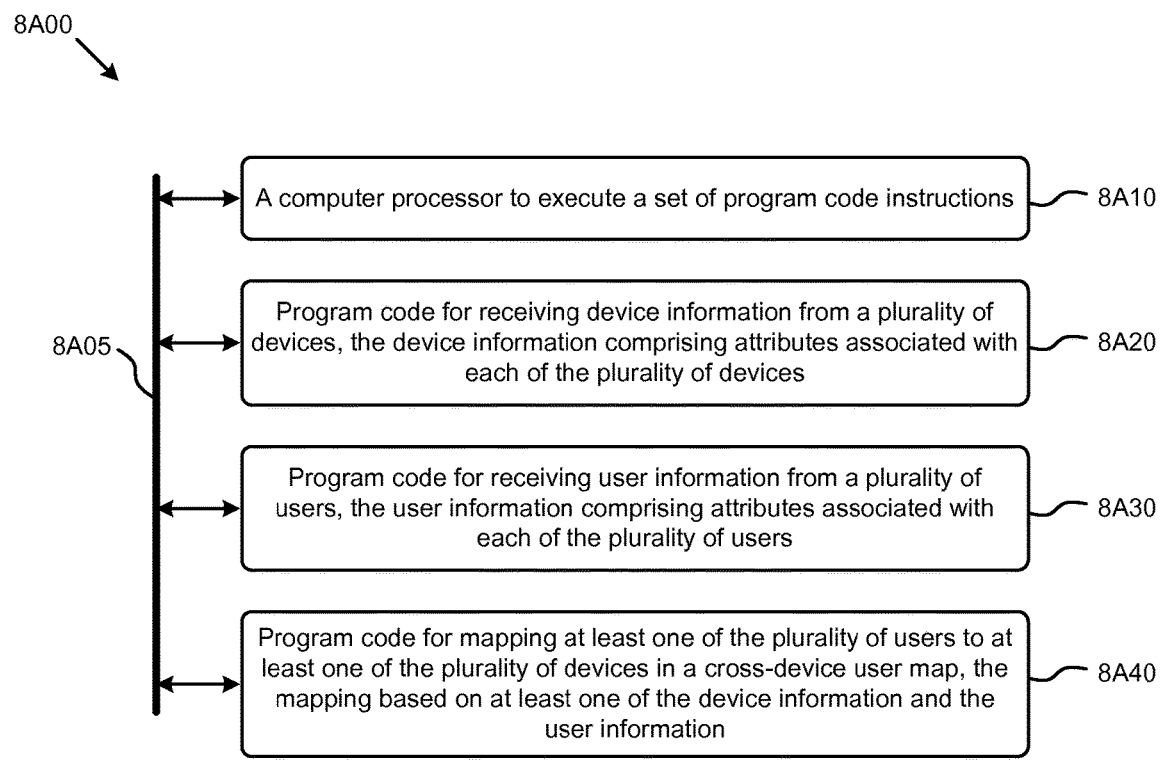
FIG. 8A and FIG. 8B depict respective systems as an arrangements of computing modules that are interconnected so as to operate cooperatively to implement certain of the herein-disclosed embodiments.

FIG. 8A depicts a system 8A00 as an arrangement of computing modules that are interconnected so as to operate cooperatively to implement certain of the herein-disclosed embodiments. The partitioning of system 8A00 is merely illustrative and other partitions are possible. The system 8A00 or any operation therein may be carried out in any desired environment. As shown, system 8A00 comprises at least one processor and at least one memory, the memory serving to store program instructions corresponding to the operations of the system 8A00.

As shown, an operation can be implemented in whole or in part using program instructions accessible by a module. The modules are connected to a communication path 8A05, and any operation can communicate with other operations over communication path 8A05. The modules of the system 8A00 can, individually or in combination, perform method operations within system 8A00. Any operations performed within system 8A00 may be performed in any order unless as may be specified in the claims. Specifically, the embodiment of FIG. 8A implements a portion of a computer system, shown as system 8A00, comprising a computer processor to execute a set of program code instructions (see module 8A10) and modules for accessing memory to hold program code instructions to perform: receiving device information from a plurality of devices, the device information comprising attributes associated with each of the plurality of devices (see module 8A20); receiving user information from a plurality of users, the user information comprising attributes associated with each of the plurality of users (see module 8A30); and mapping at least one of the plurality of users to at least one of the plurality of devices in a cross-device user map, the mapping based on at least one of the device information and the user information (see module 8A40).

Figure 8B:
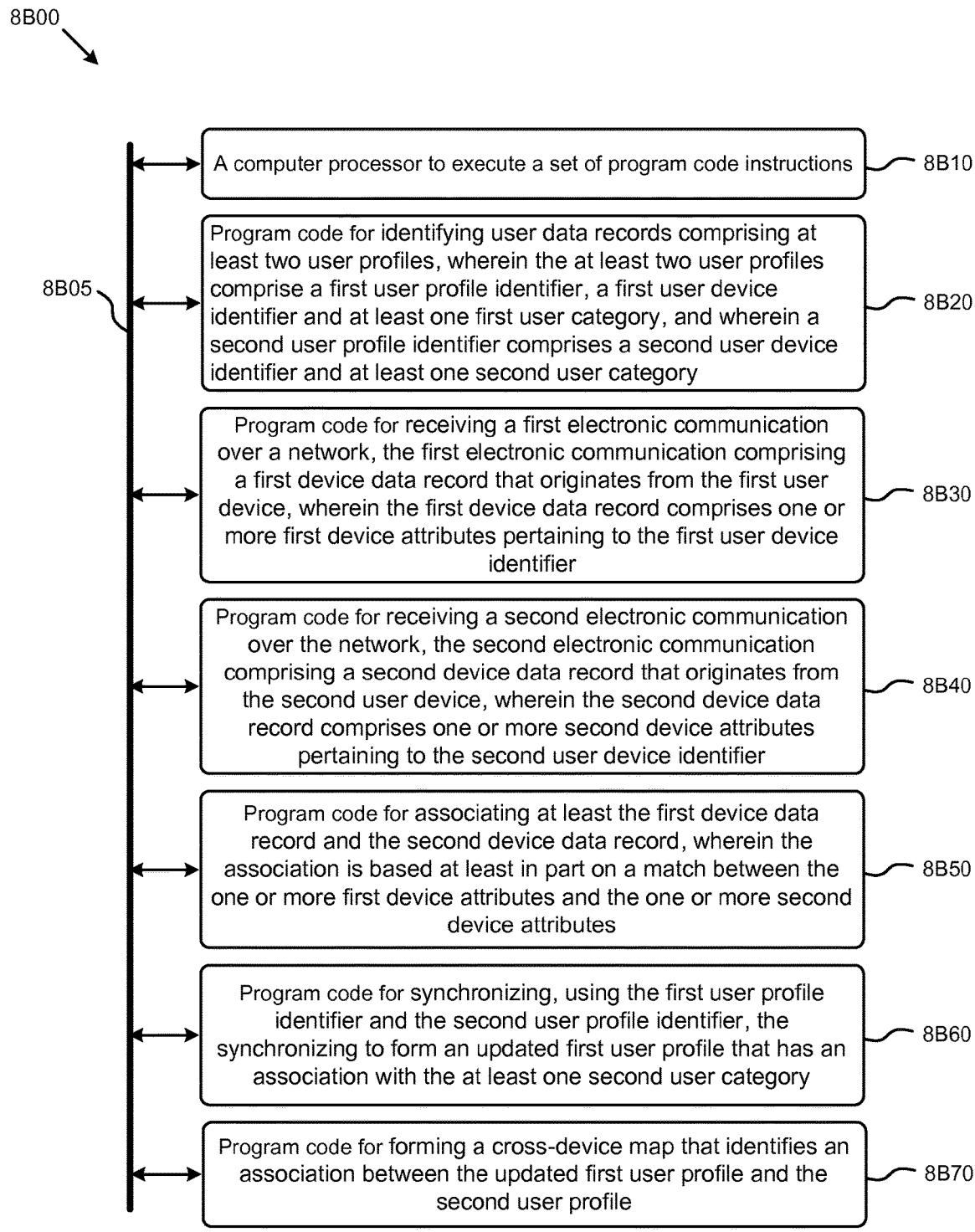

FIG. 8B depicts a system 8B00 as an arrangement of computing modules that are interconnected so as to operate cooperatively to implement certain of the herein-disclosed embodiments. As an option, the present system 8B00 may be implemented in the context of the architecture and functionality of the embodiments described herein. Of course, however, the system 8B00 or any operation therein may be carried out in any desired environment. The system 8B00 comprises at least one processor and at least one memory, the memory serving to store program instructions corresponding to the operations of the system.

As shown, an operation can be implemented in whole or in part using program instructions accessible by a module. The modules are connected to a communication path 8B05, and any operation can communicate with other operations over communication path 8B05. The modules of the system can, individually or in combination, perform method operations within system 8B00. Any operations performed within system 8B00 may be performed in any order unless as may be specified in the claims. The shown embodiment implements a portion of a computer system, presented as system 8B00, comprising a computer processor to execute a set of program code instructions (see module 8B10) and modules for accessing memory to hold program code instructions to perform: identifying user data records comprising at least two user profiles, wherein the at least two user profiles comprise a first user profile identifier, a first user device identifier and at least one first user category, and comprise a second user profile identifier, a second user device identifier and at least one second user category (see module 8B20); receiving a first electronic communication over a network, the first electronic communication comprising a first device data record that originates from the first user device, wherein the first device data record comprises one or more first device attributes pertaining to the first user device identifier (see module 8B30); receiving a second electronic communication over the network, the second electronic communication comprising a second device data record that originates from the second user device, wherein the second device data record comprises one or more second device attributes pertaining to the second user device identifier (see module 8B40); associating at least the first device data record and the second device data record, wherein the association is based at least in part on a match between the one or more first device attributes and the one or more second device attributes (see module 8B50); synchronizing, using the first user profile identifier and the second user profile identifier, to form an updated first user profile that has an association with the least one second user category (see module 8B60); and forming a cross-device map that identifies an association between the updated first user profile and the second user profile identifier (see module 8B70).

System Architecture Overview

Additional System Architecture Examples

Figure 9A:
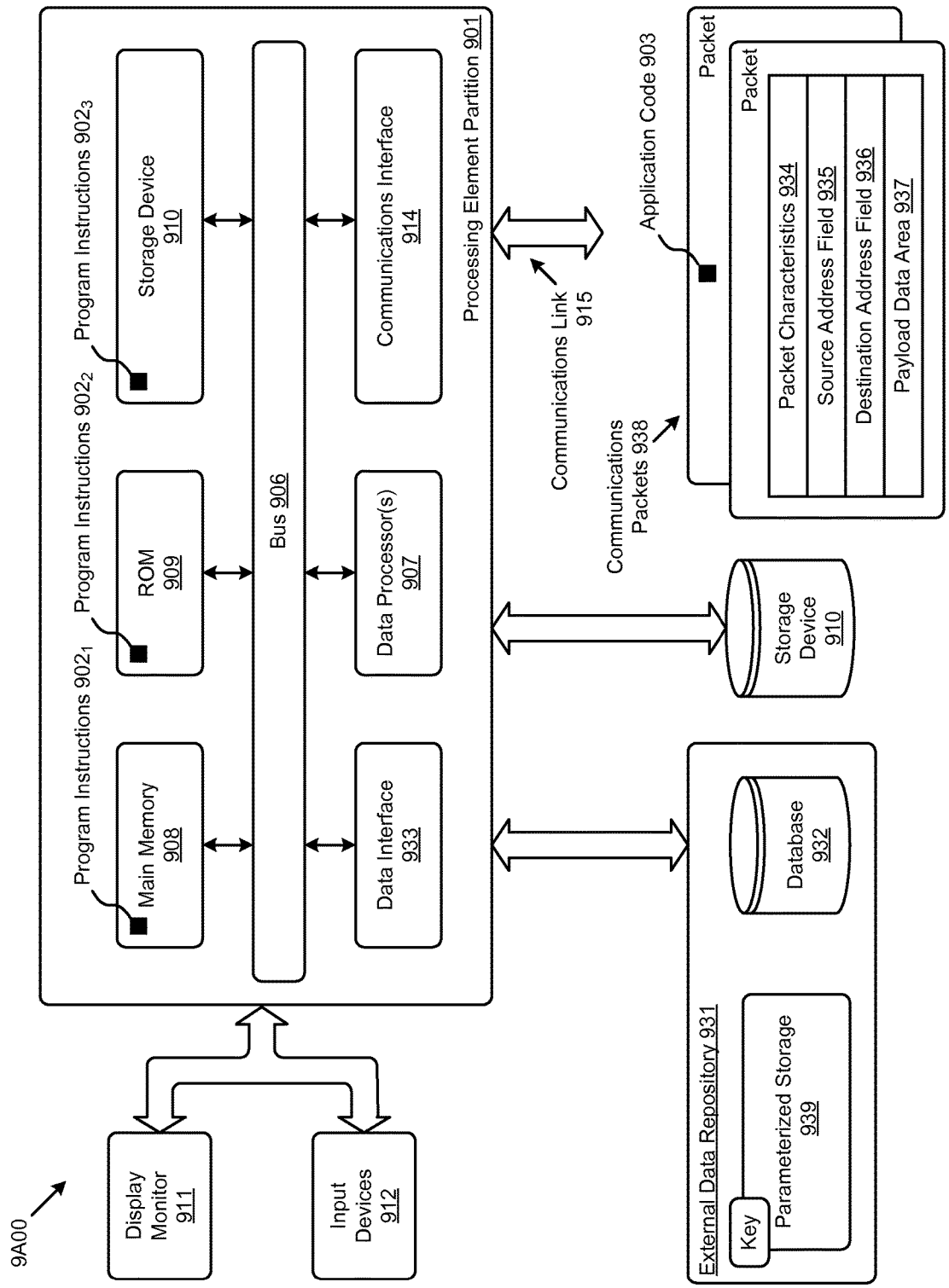
FIG. 9A, FIG. 9B, and FIG. 9C depict exemplary architectures of components suitable for implementing embodiments of the present disclosure, and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information. The bus interconnects subsystems and devices such as a CPU, or a multi-core CPU (e.g., processor 907), a system memory (e.g., main memory 908, or an area of random access memory RAM), a non-volatile storage device or area (e.g., ROM 909), an internal or external storage device 910 (e.g., magnetic or optical), a data interface 933, a communications interface 914 (e.g., PHY, MAC, Ethernet interface, modem, etc.). The aforementioned components are shown within processing element partition 901, however other partitions are possible. The shown computer system 9A00 further comprises a display 911 (e.g., CRT or LCD), various input devices 912 (e.g., keyboard, cursor control), and an external data repository 931.

According to an embodiment of the disclosure, computer system 9A00 performs specific operations by processor 907 executing one or more sequences of one or more program code instructions contained in a memory. Such instructions (e.g., program instructions $902_1$, program instructions $902_2$, program instructions $902_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination therefrom.

According to an embodiment of the disclosure, computer system 9A00 performs specific networking operations using one or more instances of communications interface 914. Instances of the communications interface 914 may comprise one or more networking ports that are configurable (e.g., pertaining to speed, protocol, physical layer characteristics, media access characteristics, etc.) and any particular instance of the communications interface 914 or port thereto can be configured differently from any other particular instance. Portions of a communication protocol can be carried out in whole or in part by any instance of the communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as processor 907.

The communications link 915 can be configured to transmit (e.g., send, receive, signal, etc.) communications packets 938 comprising any organization of data items. The data items can comprise a payload data area 937, a destination address 936 (e.g., a destination IP address), a source address 935 (e.g., a source IP address), and can include various encodings or formatting of bit fields to populate the shown packet characteristics 934. In some cases the packet characteristics include a version identifier, a packet or payload length, a traffic class, a flow label, etc. In some cases the payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 907 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of the computer system 9A00. According to certain embodiments of the disclosure, two or more instances of computer system 9A00 coupled by a communications link 915 (e.g., LAN, PTSN, or wireless network) may perform the sequence of instructions required to practice embodiments of the disclosure using two or more instances of components of computer system 9A00.

The computer system 9A00 may transmit and receive messages such as data and/or instructions organized into a data structure (e.g., communications packets 938). The data structure can include program instructions (e.g., application code 903), communicated through communications link 915 and communications interface 914. Received program code may be executed by processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

The partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a processor 907. Some embodiments include one or more special-purpose hardware components (e.g., power control, logic, sensors, transducers, etc.). A module may include one or more state machines and/or combinational logic used to implement or facilitate the performance characteristics of real-time cross-device user category synchronization.

Various implementations of the database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of real-time cross-device user category synchronization). Such files or records can be brought into and/or stored in volatile or non-volatile memory.

Figure 9B:
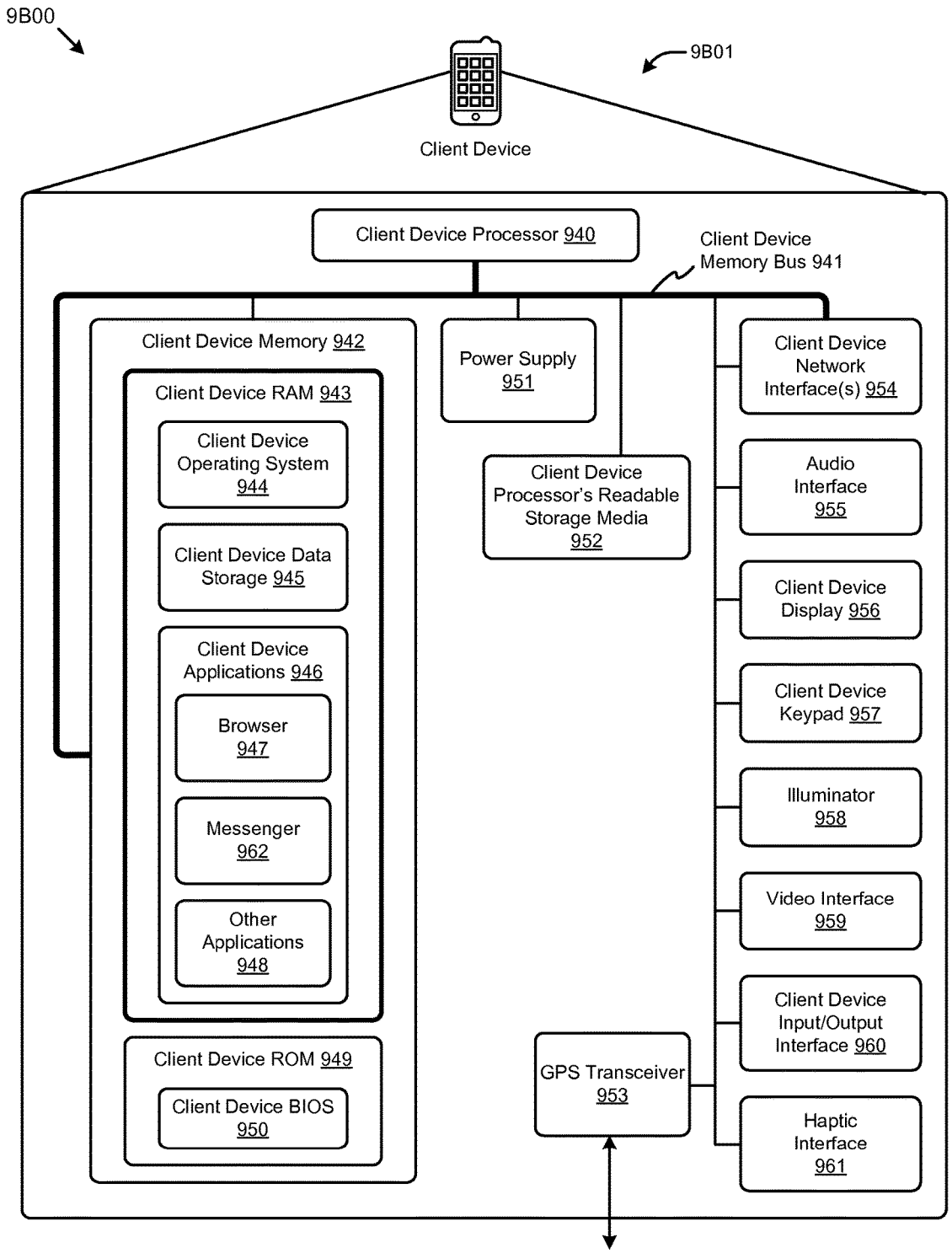

FIG. 9B depicts a block diagram 9B00 of an instance of a client device 9B01 that may be included in a system implementing instances of the herein-disclosed embodiments. Client device 9B01 may include many more or fewer components than those shown in FIG. 9B. Client device 9B01 may represent, for example, an embodiment of at least one of client devices as heretofore disclosed.

As shown in the figure, client device 9B01 includes a client device processor 940 in communication with a client device memory 942 via a client device memory bus 941. Client device 9B01 also includes a power supply 951, one or more client device network interfaces 954, an audio interface 955, a client device display 956, a client device keypad 957, an illuminator 958, a video interface 959, a client device IO interface 960, a haptic interface 961, and a GPS transceiver 953 for global positioning services.

The power supply 951 provides power to client device 9B01. A rechargeable or non-rechargeable battery may be used to provide power. The power may also be provided by an external power source such as an AC adapter or a powered docking cradle that supplements and/or recharges a battery.

A client device 9B01 may optionally communicate with a base station, or directly with another computing device. A client device network interface 954 includes circuitry for coupling a client device 9B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), IEEE 802.16 Worldwide Interoperability for Microwave Access (WiMax), session initiated protocol/real-time transport protocol (SIP/RTP), or any of a variety of other wireless communication protocols. A client device network interface is sometimes known as a transceiver, a transceiving device, or a network interface card (NIC).

An audio interface 955 is arranged to produce and receive audio signals such as the sound of a human voice. For example, audio interface 955 may be coupled to a speaker and microphone to enable telecommunication with others and/or generate an audio acknowledgement for some action.

A client device display 956 may be a liquid crystal display (LCD), gas plasma, light emitting diode (LED), or any other type of display used with a computing device. A client device display 956 may also include a touch sensitive screen arranged to receive input from an object such as a stylus or a digit from a human hand.

A client device keypad 957 may comprise any input device arranged to receive input from a user. For example, client device keypad 957 may include a push button numeric dial, or a keyboard. A client device keypad 957 may also include command buttons that are associated with selecting and sending images.

An illuminator 958 may provide a status indication and/or provide light. Illuminator 958 may remain active for specific periods of time or in response to events. For example, when the illuminator 958 is active, it may backlight the buttons on client device keypad 957 and stay on while the client device is powered. Also, the illuminator 958 may backlight these buttons in various patterns when particular actions are performed such as dialing another client device. An illuminator 958 may also cause light sources positioned within a transparent or translucent case of the client device to illuminate in response to actions.

A video interface 959 is arranged to capture video images such as a still photo, a video segment, an infrared video or the like. For example, the video interface 959 may be coupled to a digital video camera, a web-camera or the like. A video interface 959 may comprise a lens, an image sensor, and other electronics. Image sensors may include a complementary metal-oxide-semiconductor (CMOS) integrated circuit, charge-coupled device (CCD), or any other integrated circuit for sensing light.

Some instances of the shown client device 9B01 comprise a client device IO interface 960 for communicating with external devices such as a headset, or other input or output devices not shown in FIG. 9B. The client device IO interface 960 can use one or more communication technologies such as a USB, infrared, Bluetooth™ port or the like. A haptic interface 961 is arranged to as a human interface device (HID) to facilitate interaction with a user of a client device. Such interaction can include tactile feedback to a user of the client device. For example, the haptic interface 961 may be employed to cause vibration of the client device 9B01 in a particular way (e.g., with a pattern or periodicity) and/or when interacting with one or another user.

A GPS transceiver 953 can determine the physical coordinates of client device 9B01 on the surface of the Earth. The GPS transceiver 953, in some embodiments, may be optional. The shown GPS transceiver 953 outputs a location such as a latitude value and a longitude value. However, the GPS transceiver 953 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 9B01 on the surface of the Earth. It is understood that under different conditions, a GPS transceiver 953 can determine a physical location within millimeters for client device 9B01; and in other cases, the determined physical location may be less precise such as within a meter or significantly greater distances. In certain embodiments, the client device 9B01 may provide other information that may be employed to determine a physical location of the device including, for example, a media access control (MAC) address, IP address, IP port identifier, or the like.

The client device memory 942 includes random access memory 943, read-only memory 949, and other storage means. The client device memory 942 illustrates an example of computer readable storage media (devices) for storage of information such as computer readable instructions, data structures, program modules or other data. The client device memory 942 stores a basic IO system (BIOS) in the embodiment of client device BIOS 950 for controlling low-level operation of client device 9B01. The memory also stores an operating system 944 for controlling the operation of client device 9B01. It will be appreciated that this component may include a general-purpose operating system such as a version of UNIX, or LINUX™, or a specialized client communication operating system such as Microsoft Corporation's Windows Mobile™, Apple Corporation's iOS™ Google Corporation's Android™, or the Symbian® operating system. The operating system may include, or interface with a Java virtual machine module that enables control of hardware components and/or operating system operations via Java application programs.

The client device memory 942 further includes one or more instances of client device data storage 945, which can be used by client device 9B01 to store, among other things, client device applications 946 and/or other data. For example, client device data storage 945 may also be employed to store information that describes various capabilities of client device 9B01. The information may then be provided to another device based on any of a variety of events including being sent as part of a header during a communication, sent upon request or the like. Client device data storage 945 may also be employed to store social networking information including address books, buddy lists, aliases, user profile information or the like. Further, client device data storage 945 may also store messages, web page content, or any of a variety of content (e.g., received content, user generated content, etc.).

At least a portion of the information may also be stored on any component or network device including, but not limited, to a client device processor's readable storage media, a disk drive or other computer readable storage devices within client device 9B01, etc.

An instance of a client device processor's readable storage media 952 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. The aforementioned readable storage media may also be referred to herein as computer readable storage media.

The client device applications 946 may include computer executable instructions which, when executed by client device 9B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 946 may include, for example, a messenger 962, a browser 947, and other applications 948. Certain other applications 948 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, other applications 948 may collect and store user data that may be received from other computing devices in the environment.

A messenger 962 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in certain embodiments, the messenger 962 may be configured as an IM application such as AOL (America Online) instant messenger, Yahoo! messenger, .NET messenger server, ICQ or the like. In certain embodiments, the messenger 962 may be configured to include a mail user agent (MUA) such as Elm, Pine, message handling (MH), Outlook, Eudora, Mac Mail, Mozilla Thunderbird or the like. In another embodiment, the messenger 962 may be a client device application that is configured to integrate and employ a variety of messaging protocols including, but not limited, to various push and/or pull mechanisms for client device 9B01. In certain embodiments, the messenger 962 may interact with the browser 947 for managing messages. As used herein, the term "message" refers to any of a variety of messaging formats, or communications form including, but not limited to, email, SMS, IM, MMS, IRC or the like.

A browser 947 may include virtually any application configured to receive and display graphics, text, multimedia, messages and the like, employing virtually any web based language. In certain embodiments, the browser application is enabled to employ HDML, WML, WMLScript, JavaScript, SGML, HTML, XML and the like, to display and send a message. However, any of a variety of other web-based programming languages may be employed. In certain embodiments, a browser 947 may enable a user of client device 9B01 to communicate with another network device as may be present in the environment.

Figure 9C:
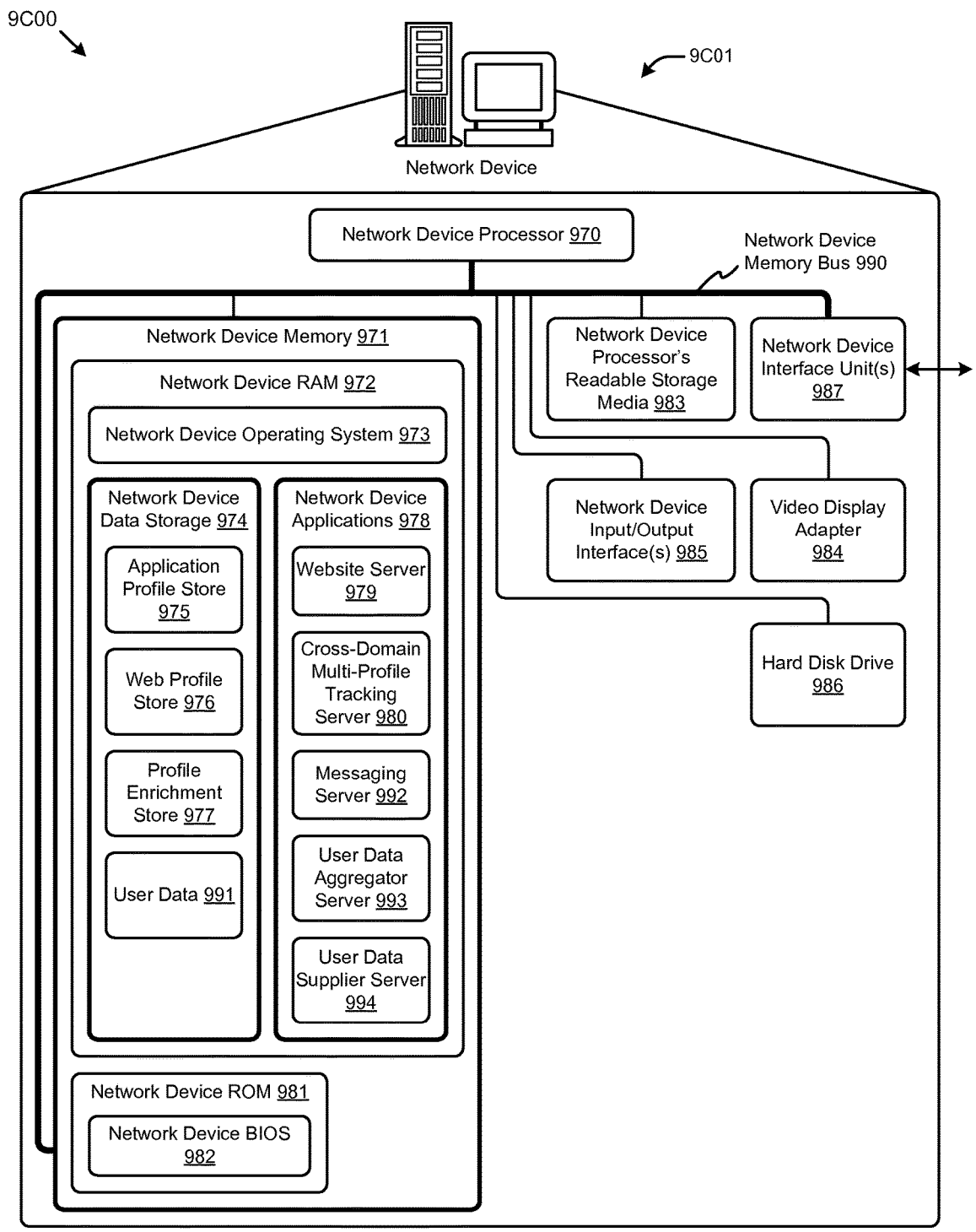

FIG. 9C depicts a block diagram 9C00 of an instance of a network device 9C01 that may be included in a system implementing instances of the herein-disclosed embodiments. Network device 9C01 may include many more or fewer components than those shown. Network device 9C01 may be configured to operate as a server, client, peer, a host, or any other device.

The network device 9C01 includes at least one instance of a network device processor 970, instances of readable storage media, one or more instances of a network interface unit 987, a network device IO interface 985, a hard disk drive 986, a video display adapter 984, and a network device memory 971, all in communication with each other via a network device memory bus 990. The network device memory generally includes network device RAM 972, network device ROM 981. Some embodiments include one or more non-volatile mass storage devices such as a hard disk drive 986, a tape drive, an optical drive, and/or a floppy disk drive. The network device memory stores a network device operating system 973 for controlling the operation of network device 9C01. Any general-purpose operating system may be employed. A basic input/output system (BIOS) is also provided in the form of network device BIOS 982 for controlling the low-level operation of network device 9C01. As illustrated in FIG. 9C, a network device 9C01 also can communicate with the Internet, or some other communications network, via a network interface unit 987, which is constructed for use with various communication protocols including the TCP/IP protocol. A network interface unit 987 is sometimes known as a transceiver, a transceiving device, or a network interface card (NIC). Network device 9C01 also comprises a network device IO interface 985 for communicating with external devices such as a keyboard or other input or output devices. A network device IO interface 985 can use one or more communication technologies such as USB, infrared, Bluetooth™ or the like.

The storage devices as described above may use various types of computer readable media, namely tangible forms of non-volatile computer readable storage media and/or a client device processor's readable storage media 952 and/or a network device processor's readable storage media 983. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

As shown, network device data storage 974 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 974 may further include program code, data, algorithms and the like, for use by a processor such as a network device processor 970 to execute and perform actions. In certain embodiments, at least some of the logical contents of network device data storage 974 might be stored on another component of network device 9C01, such as on a second instance of hard disk drive 986 or on an external/removable storage device.

The network device data storage 974 may further store any portions of application data and/or user data such as an application profile store 975, a web profile store 976, a profile enrichment store 977 and/or any user data collected. In some embodiments, user data 991 may store unique user data, non-unique user data, aggregated user data, and/or any combination thereof. User data 991 may include a variety of attributes such as a five digit zip code, an expanded nine digit zip code and the like.

The Network device data storage 974 may also store program code and data. One or more network device applications 978 may be loaded into network device data storage or any other mass memory, to be accessible to run with or as a part of network device operating system 973. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 992, website server 979, user data aggregator server 993, a cross-domain multi-profile tracking server 980, and/or user data supplier server 994 may also be included within or implemented as application programs.

A messaging server 992 may include virtually any computing component or components configured and arranged to forward messages from message user agents and/or other message servers, or to deliver messages to a local message store such as network device data storage 974 or the like. Thus, a messaging server 992 may include a message transfer manager to communicate a message employing any of a variety of email protocols including, but not limited, to simple mail transfer protocol (SMTP), post office protocol (POP), Internet message access protocol (IMAP), network new transfer protocol (NNTP) or the like. A messaging server 992 may also be managed by one or more components of the messaging server 992. Thus, the messaging server 992 may also be configured to manage SMS messages; IM, MMS, IRC, or RSS feeds; mIRC; or any of a variety of other message types. In certain embodiments, the messaging server 992 may enable users to initiate and/or otherwise conduct chat sessions, VOIP sessions or the like.

A website server 979 may represent any of a variety of information and services that are configured to provide content, including messages, over a network to another computing device. Thus, a website server 979 can include, for example, a web server, a file transfer protocol (FTP) server, a database server, a content server or the like. A website server 979 may provide the content including messages over the network using any of a variety of formats including, but not limited to WAP, HDML, WML, SGML, HTML, XML, compact HTML (cHTML), extensible HTML (xHTML) or the like. A website server 979 may also be configured to enable a user of a client device to browse websites, upload user data, view and interact with advertisements or the like.

A user data aggregator server 993 is configured to aggregate user data to be provided to user data buyers for advertising campaigns. In certain embodiments, a user data aggregator server 993 may be configured to receive collected user data from a user data supplier server 994. In some embodiments, a user data aggregator server 993 may receive a query for user data. Based on the query, a user data aggregator server 993 may generate a plurality of subsets of aggregated user data. In some embodiments, user data aggregator server 993 may be included in a network device.

A user data supplier server 994 is configured to collect user data. In certain embodiments, the user data supplier server 994 may be configured to provide the collected user data to user data aggregator server 993. In some embodiments, the user data supplier server 994 may collect and/or provide unique user data and/or non-unique user data. In certain embodiments, the user data supplier server 994 may aggregate the collected user data. In some embodiments, the user data supplier server 994 may be included in any computing device such as heretofore described.

Returning to discussion of the heretofore introduced environments, the environments includes components with which various systems can be implemented. Not all of the components shown may be required to practice the embodiments, and variations in the arrangement and type of the components may be made without departing from the spirit or scope of the disclosure.

Various environment in which embodiments of the disclosure operate may include local area networks (LANs)/wide area networks (WANs), wireless networks, client devices (e.g., user stations). The overall network, including any sub-networks and/or wireless networks, are in communication with, and enables communication between components in the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In certain embodiments, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In certain embodiments, a user of the client device may employ the browser application to perform various activities over a network (online). However, another application may also be used to perform various online activities.

Client devices may include at least one client application that is configured to receive and/or send data between other computing devices (e.g., server components). The client application may include a capability to provide send and/or receive content or the like. The client application may further provide information that identifies itself including a type, capability, name or the like. In certain embodiments, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In certain embodiments, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between any other computing devices and/or over or between other networks or network components.

Any of the foregoing networks can be configured to couple network devices with other computing devices and communication can include communicating over the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communications links within LANs may include twisted wire pair or coaxial cable, while communications links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communications links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In various embodiments, network 108 may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
   receiving, from a first user device, a first electronic communication over a network, the first electronic communication including a first device data record, wherein the first device data record includes one or more first device attributes associated with a first user device identifier, and wherein the one or more first device attributes include one or more of: a device connection characteristic, an Internet Protocol (IP) port number, an IP address, a Wi-Fi network associated with the first user device, a Wi-Fi Service Set Identifier (SSID), a web site visited, or a portion of a header of the first electronic communication;
   generating a first user profile, the first user profile including a first user profile identifier, the first user device identifier, and one or more first user categories, wherein the one or more first user categories are associated with the first device data record;
   storing the first user profile in a user profile database;
   receiving, from a second user device, a second electronic communication over a network, the second electronic communication including a second device data record, wherein the second device data record includes one or more second device attributes associated with a second user device identifier;
   determining that the second electronic communication cannot be unambiguously associated with the first user profile;
   generating, based on determining that the second electronic communication cannot be unambiguously associated with the first user profile, a second user profile, the second user profile including a second user profile identifier, the second user device identifier, and one or more second user categories, the one or more second user categories being associated with the one or more second device attributes;
   storing the second user profile in the user profile database;
   receiving, from the second user device, a third electronic communication over a network, the third electronic communication comprising an additional device data record, wherein the additional device data record comprises one or more additional device attributes pertaining to the second user device identifier;

determining, based on the third electronic communication originating from the second user device, that the third electronic communication is associated with the second user profile;

modifying, based on determining that the third electronic communication is associated with the second user profile, the second user profile to include the one or more additional device attributes of the third electronic communication;

determining, based in part on the first user profile and the modified second user profile, that a same user is associated with the first user profile and the second user profile;

synchronizing, based on that the first user profile and the modified second user profile are associated with the same user, the first user profile and the modified second user profile, wherein synchronizing the first user profile and the second user profile forms an updated first user profile that includes an association between the updated first user profile and the one or more second user categories, wherein the updated first user profile and the modified second user profile are synchronized upon receiving the third electronic communication;

generating, based on synchronizing the first user profile and the second user profile, a cross-device map that identifies an association between the updated first user profile identifier, the second user profile identifier, the first user device identifier, and the second user device identifier; and transmitting, based on one or more categories of the updated first user profile, content to the first user device, wherein subsequent to transmitting content the association between the first user profile and the one or more second user categories is not saved.

2. The method of claim 1, further comprising:
identifying a set of target devices using the second user profile, wherein each target device of the set of target devices is associated with a user profile that includes at least one category that is also included in the one or more second user categories of the second user profile.

3. The method of claim 2, further comprising:
transmitting an indication the set of target devices to a remote device.

4. The method of claim 1, further comprising:
transmitting at least a portion of the cross-device map to a remote device.

5. The method of claim 1, further comprising:
enabling access to the cross-device map by a remote device, wherein once enabled data from each user profile associated with the cross-device map is accessible to the remote device.

6. The method of claim 1, wherein the one or more first user categories or the one or more second user categories include one or more of: an observed user behavior, an observed user interest, a stated user interest, a user browsing history entry, a user location, a user location history, or a survey answer.

7. The method of claim 1, wherein synchronizing the first user profile and the second user profile forms an association between the second user profile with the one or more first user categories.

8. The method of claim 1, wherein the first device data record includes a merged user profile or a bridged user profile.

9. A computer program product, embodied in a non-transitory computer readable medium, the non-transitory computer readable medium having stored thereon a sequence of instructions which, when executed by a processor causes the processor to operations including:

receiving, from a first user device, a first electronic communication over a network, the first electronic communication including a first device data record, wherein the first device data record includes one or more first device attributes associated with a first user device identifier, and wherein the one or more first device attributes include one or more of: a device connection characteristic, an Internet Protocol (IP) port number, an IP address, a Wi-Fi network associated with the first user device, a Wi-Fi Service Set Identifier (SSID), a web site visited, or a portion of a header of the first electronic communication;

generating a first user profile, a the first user profile including a first user profile identifier, the first user device identifier, and one or more first user categories, wherein the one or more first user categories are associated with the first device data record;

storing the first user profile in a user profile database;

receiving, from a second user device, a second electronic communication over a network, the second electronic communication including a second device data record, wherein the second device data record includes one or more second device attributes associated with a second user device identifier;

determining that the second electronic communication cannot be unambiguously associated with the first user profile;

generating, based on determining that the second electronic communication cannot be unambiguously associated with the first user profile, a second user profile, the second user profile including a second user profile identifier, the second user device identifier, and one or more second user categories, the one or more second user categories being associated with the one or more second device attributes;

storing the second user profile in the user profile database;

receiving, from the second user device, a third electronic communication over a network, the third electronic communication comprising an additional device data record, wherein the additional device data record comprises one or more additional device attributes pertaining to the second user device identifier;

determining, based on the third electronic communication originating from the second user device, that the third electronic communication is associated with the second user profile;

modifying, based on determining that the third electronic communication is associated with the second user profile, the second user profile to include the one or more additional device attributes of the third electronic communication;

determining, based in part on the first user profile and the modified second user profile, that a same user is associated with the first user profile and the second user profile;

synchronizing, based on that the first user profile and the modified second user profile are associated with the same user, the first user profile and the modified second user profile, the first user profile and the second user profile, wherein synchronizing the first user profile and the second user profile forms an updated first user profile that includes an association between the first user profile and the one or more second user categories, wherein the updated first user profile and the modified second user profile are synchronized upon receiving the third electronic communication;

generating, based on synchronizing the updated first user profile and the modified second user profile, a cross-device map that identifies an association between the updated first user profile identifier and the second user profile identifier, the first user device identifier, and the second user device identifier; and transmitting, based on one or more categories of the first user profile, content to the first user device, wherein subsequent to transmitting content the association between the first user profile and the one or more second user categories is not saved.

10. The computer program product of claim 9, further comprising:
identifying a set of target devices using the second user profile, wherein each target device of the set of target devices is associated with a user profile that includes at least one category that is also included in the one or more second user categories of the second user profile.

11. The computer program product of claim 10, further comprising:
transmitting an indication of the set of target devices to a remote device.

12. The computer program product of claim 9, further comprising:
transmitting at least a portion of the cross-device map to a remote device.

13. The computer program product of claim 9, further comprising:
enabling access to the cross-device map by a remote device, wherein once enabled data from each user profile associated with the cross-device map is accessible to the remote device.

14. The computer program product of claim 9, wherein the one or more first user categories or the one or more second user categories comprises at least one of: an observed user behavior, an observed user interest, a stated user interest, a user browsing history entry, a user location, a user location history, or a survey answer.

15. The computer program product of claim 9, wherein instructions for synchronizing the first user profile and the second user profile form an association between the second user profile with the one or more first user categories.

16. A system comprising:
a processor;
a non-transitory computer readable medium, the non-transitory computer readable medium having stored thereon a sequence of instructions which, when executed by a processor causes the processor to operations including:
receiving, from a first user device, a first electronic communication over a network, the first electronic communication including a first device data record, wherein the first device data record includes one or more first device attributes associated with a first user device identifier, and wherein the one or more first device attributes include one or more of: a device connection characteristic, an Internet Protocol (IP) port number, an IP address, a Wi-Fi network associated with the first user device, a Wi-Fi Service Set Identifier (SSID), a website visited, or a portion of a header of the first electronic communication;
generating a first user profile, the first user profile including a first user profile identifier, the first user device identifier, and one or more first user categories, wherein the one or more first user categories are associated with the first device data record;
storing the first user profile in a user profile database;
receiving, from a second user device, a second electronic communication over a network, the second electronic communication including a second device data record, wherein the second device data record includes one or more second device attributes associated with a second user device identifier;
determining that the second electronic communication cannot be unambiguously associated with the first user profile;
generating, based on determining that the second electronic communication cannot be unambiguously associated with the first user profile, a second user profile, the second user profile including a second user profile identifier, the second user device identifier, and one or more second user categories, the one or more second user categories being associated with the one or more second device attributes;
storing the second user profile in the user profile database;
receiving, from the second user device, a third electronic communication over a network, the first electronic communication comprising an additional device data record, wherein the additional device data record comprises one or more additional device attributes pertaining to the second user device identifier
determining, based on the third electronic communication originating from the second user device, that the third electronic communication is associated with the second user profile;
modifying, based on determining that the third electronic communication is associated with the second user profile, the second user profile to include the one or more additional device attributes of the third electronic communication;
determining, based in part on the first user profile and the modified second user profile, that a same user is associated with the first user profile and the second user profile;
synchronizing, based on that the first user profile and the modified second user profile are associated with the same user, the first user profile and the second user profile, wherein synchronizing the first user profile and the modified second user profile forms an updated first user profile that includes an association between the first user profile and the one or more second user categories, wherein the updated first user profile and the modified second user profile are synchronized upon receiving the third electronic communication;
generating, based on synchronizing the updated first user profile and the modified second user profile, a cross-device map that identifies an association between the updated first user profile identifier, the second user profile identifier, the first user device identifier, and the second user device identifier; and
transmitting, based on one or more categories of the first user profile, content to the first user device, wherein subsequent to transmitting content the association between the first user profile and the one or more second user categories is not saved.

17. The system of claim 16, further comprising:
identifying a set of target devices using the second user profile, wherein each target device of the set of target devices is associated with a user profile that includes at least one category that is also included in the one or more second user categories of the second user profile.

* * * * *

UNITED STATES PATENT AND TRADEMARK OFFICE
CERTIFICATE OF CORRECTION

PATENT NO. : 10,460,353 B2
APPLICATION NO. : 14/734473
DATED : October 29, 2019
INVENTOR(S) : Hsu et al.

Page 1 of 1

It is certified that error appears in the above-identified patent and that said Letters Patent is hereby corrected as shown below:

In the Claims

In Column 28, Line 39, in Claim 1, delete "web site" and insert -- website --, therefor.

In Column 30, Line 16, in Claim 9, delete "web site" and insert -- website --, therefor.

In Column 30, Line 18, in Claim 9, before "the" delete "a".

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*